(12) United States Patent
Hurst et al.

(10) Patent No.: US 9,497,451 B2
(45) Date of Patent: Nov. 15, 2016

(54) CABLE NETWORK DATA ANALYTICS SYSTEM

(71) Applicant: Profusion Analytics, Greenwood Village, CO (US)

(72) Inventors: Lukas Hurst, Aurora, CO (US); Christine F. Fiske, Centennial, CO (US); Tom Gorman, Castle Pines, CO (US); Raymond H. Harrison, Denver, CO (US); Richard M. Hurwitz, Telluride, CO (US); Idilio Moncivais-Pinedo, Broomfield, CO (US)

(73) Assignee: Profusion Analytics, Greenwood Village, CO (US)

( * ) Notice: Subject to any disclaimer, the term of this patent is extended or adjusted under 35 U.S.C. 154(b) by 23 days.

(21) Appl. No.: 14/500,642

(22) Filed: Sep. 29, 2014

(65) Prior Publication Data
US 2015/0095960 A1    Apr. 2, 2015

Related U.S. Application Data

(60) Provisional application No. 61/883,488, filed on Sep. 27, 2013.

(51) Int. Cl.
| | |
|---|---|
| *H04N 7/173* | (2011.01) |
| *H04N 17/00* | (2006.01) |
| *H04N 21/24* | (2011.01) |
| *H04N 21/61* | (2011.01) |
| *H04B 3/46* | (2015.01) |

(52) U.S. Cl.
CPC ............. *H04N 17/004* (2013.01); *H04B 3/46* (2013.01); *H04N 17/00* (2013.01); *H04N 21/2402* (2013.01); *H04N 21/6168* (2013.01)

(58) Field of Classification Search
CPC .............. H04N 17/004; H04N 21/6168; H04N 21/6118
USPC .......................... 725/107, 124–128; 709/224
See application file for complete search history.

(56) References Cited

U.S. PATENT DOCUMENTS

| | | | |
|---|---|---|---|
| 6,385,773 B1 * | 5/2002 | Schwartzman et al. ................. | H04N 7/17309 348/E7.07 |
| 6,574,797 B1 * | 6/2003 | Naegeli et al. ........ | H04N 17/00 348/192 |
| 6,757,253 B1 * | 6/2004 | Cooper et al. ......... | H04H 20/42 348/E7.075 |
| 6,961,314 B1 * | 11/2005 | Quigley et al. ....... | H04J 3/0682 370/252 |

(Continued)

OTHER PUBLICATIONS

CEA Standard Cable Television Channel Identification Plan, Consumer Electronics Association, Jun. 2013.

(Continued)

*Primary Examiner* — Annan Shang
(74) *Attorney, Agent, or Firm* — Dunlap Codding, P.C.

(57) ABSTRACT

A cable network data analytics system is configured to aggregate spectrum data sets of one or more readable devices connected to one or more cable networks. The spectrum data sets may include video spectrum data. The video spectrum data may be indicative of performance aspects of one or more standard channels of the cable network. The aggregated spectrum data may be analyzed against predetermined performance requirements such that an alert may be generated if one or more performance aspects do not meet the predetermined performance requirements.

23 Claims, 19 Drawing Sheets

(56) References Cited

U.S. PATENT DOCUMENTS

| | | | |
|---|---|---|---|
| 7,020,701 B1* | 3/2006 | Gelvin et al. | G01D 21/00 250/332 |
| 7,139,283 B2* | 11/2006 | Quigley et al. | H04L 1/203 370/432 |
| 7,239,650 B2* | 7/2007 | Rakib et al. | H03M 13/256 348/E7.07 |
| 7,509,670 B1* | 3/2009 | Naegeli et al. | H04N 7/17309 725/124 |
| 7,512,154 B2* | 3/2009 | Quigley et al. | H04L 1/203 370/468 |
| 7,774,809 B1* | 8/2010 | Harvey et al. | G06Q 30/0251 370/270 |
| 8,223,859 B2* | 7/2012 | Heidari et al. | H04B 3/542 375/219 |
| 8,578,437 B2* | 11/2013 | Nielsen et al. | H04B 3/50 725/125 |
| 2003/0212999 A1* | 11/2003 | Cai | H04L 12/66 725/119 |
| 2012/0095960 A1* | 4/2012 | Rowley | G06F 17/30362 707/622 |
| 2012/0307983 A1* | 12/2012 | Faulkner et al. | H04B 3/46 379/29.03 |
| 2013/0125183 A1* | 5/2013 | Gomez et al. | H04N 17/00 725/107 |
| 2013/0191877 A1* | 7/2013 | Rakib | H04N 21/6118 725/129 |

OTHER PUBLICATIONS

Data-Over-Cable Service Interface Specification DOCSIS 3.1, CCAP Operations Support System Interface Specification, CM_SP_CCAP-OSSIv3.1-I01-140808, Cable Television Laboratories, Inc. 2014.

* cited by examiner

CABLE NETWORK DATA ANALYTICS SYSTEM

CROSS REFERENCE TO RELATED APPLICATIONS

The present patent application incorporates by reference the entire provisional patent application identified by U.S. Ser. No. 61/883,488, filed on Sep. 27, 2013, and claims priority thereto under 35 U.S.C. §119(3).

BACKGROUND

The inventive concepts disclosed herein relate generally to cable network data analytics systems, and more specifically but not by way of limitation, to systems and methods for procuring, analyzing, enriching, and publishing spectrum data to provide business and operational intelligence to network operators.

Network operators, such as cable network operators, provide video (e.g., television channels), Internet, telephony, and other services to customers by transmitting signals (e.g., digital radiofrequency and/or optical signals including a spectrum of frequencies) over cable networks (e.g., hybrid optical fiber coaxial cable networks) to multiple communities under various franchise agreements. Network operators have been able to remotely read and marginally analyze Internet and telephony spectral data from their cable networks by procuring limited management information base (MIB) files from their customers' modems or other readable network devices. However, until recently such MIB files only included data for the Internet and telephony spectra and lacked data for the video spectrum. While valuable, the business and operational intelligence provided to network operators from the Internet and telephony spectra provided a limited portion of the full spectrum of signals transmitted through the cable network, and did not include the video frequencies within the full spectrum transmitted to network devices.

Throughout the last decade, network operators have utilized digital video compression transmitted through digital consumer terminals (DCTs) to distribute video content to their customers. Until recently, measuring the magnitude of the input signal versus frequency within the full-spectral range of the DCTs was not possible from a remote location. Instead, network operators had limited insight into the video spectrum through the use of hand-held spectrum analyzers capable of monitoring one DCT at one customer premise at a time, which relied on a technician being physically present on, or near, the customer premises to measure and/or monitor the video spectrum.

Similar to analyzing the Internet and telephony spectral data, it is advantageous for network operators to measure the power of the video spectrum of both known and unknown signals at readable devices coupled with the cable network, to provide a clearer and more reliable video signal to cable network customers. Providing robust RF-spectrum signal analytics for customer premises in a cable network from a remote location may reduce the need for node sweeps (e.g., physically connecting equipment to a node or a readable device to inspect performance) and/or may reduce or obviate trips to customer premises, by arming network operators with advanced intelligence and allowing network operators to proactively mitigate signal issues before the signal issues impact services.

BRIEF DESCRIPTION OF THE DRAWINGS

Like reference numerals in the figures represent and refer to the same or similar element or function. Embodiments of the present disclosure may be better understood when consideration is given to the following detailed description thereof. Such description makes reference to the annexed pictorial illustrations, schematics, graphs, drawings, and appendices. In the drawings.

DETAILED DESCRIPTION OF EXEMPLARY EMBODIMENTS

Figure 1:
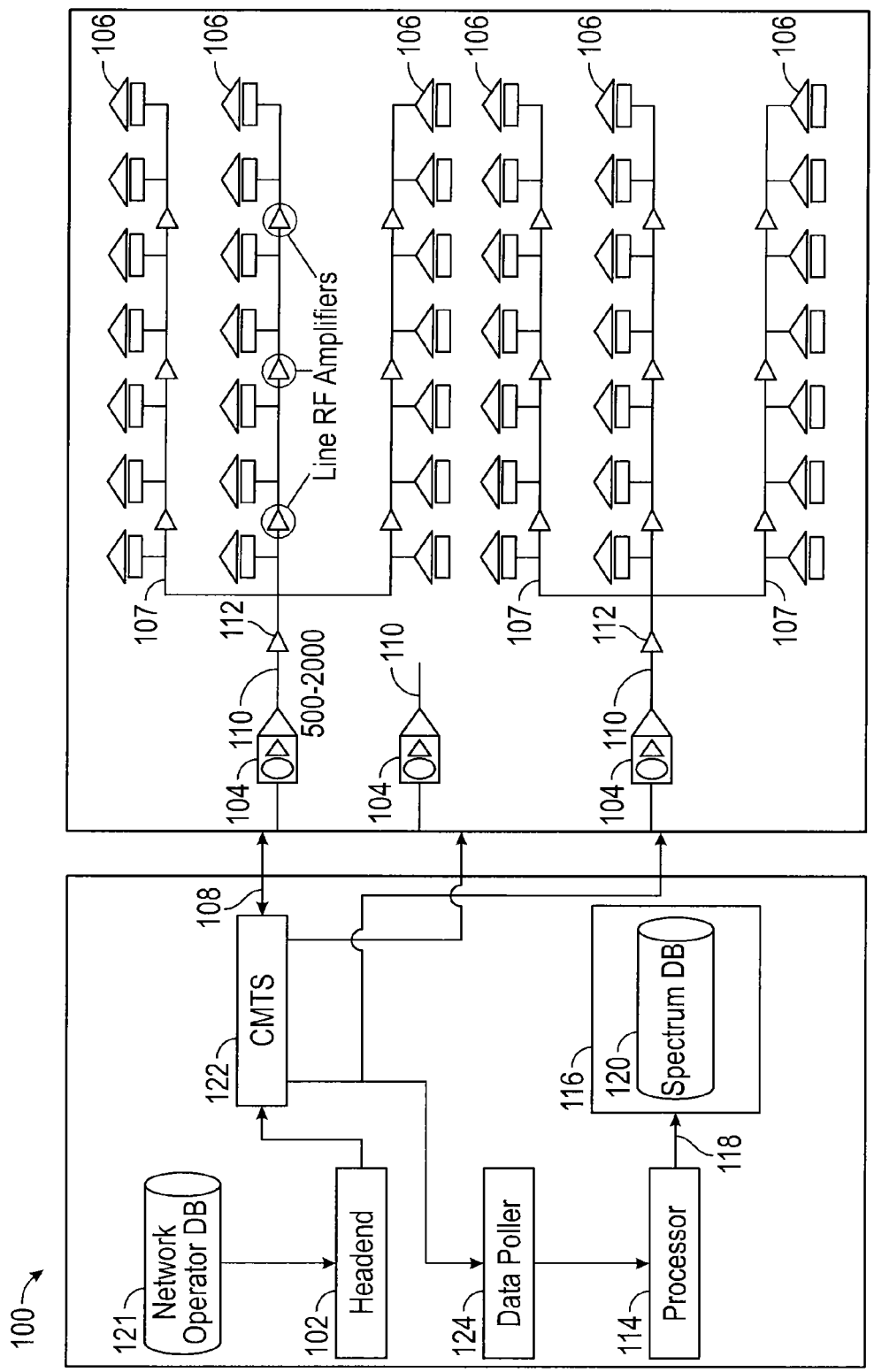
FIG. 1 is an illustration of an exemplary embodiment of a cable network according to the present disclosure.

Before explaining at least one embodiment of the present disclosure in detail, it is to be understood that embodiments of the present disclosure are not limited in their application to the details of construction and the arrangement of the components or steps or methodologies set forth in the following description or illustrated in the drawings. The inventive concepts in the present disclosure are capable of other embodiments or of being practiced or carried out in various ways. Also, it is to be understood that the phraseology and terminology employed herein is for the purpose of description and should not be regarded as limiting.

Exemplary embodiments of the present disclosure will now be described in detail with reference to the accompanying drawings. Further, in the following detailed description of embodiments of the present disclosure, numerous specific details are set forth in order to provide a more thorough understanding of the disclosure. However, it will be apparent to one of ordinary skill in the art that the embodiments disclosed herein may be practiced without these specific details. In other instances, well-known features have not been described in detail to avoid unnecessarily complicating the present disclosure.

As used herein, language such as "including," "comprising," "having," "containing," or "involving," and variations thereof, is intended to be broad and encompass the subject matter listed thereafter, equivalents, and additional subject matter not recited or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

As used herein, the term "network operator" or "network operators", and variations thereof, includes a provider of products and/or services which may include high-speed Internet, telephone service (telephony) and video programming (e.g., one or more television or digital video channels), over a telecommunications network, such as a cable network, a hybrid fiber-coaxial network, a public telephone switched network, a digital subscriber line network, or combinations thereof, for example.

As used herein, a cable network is a telecommunications network which includes network devices, such as cable modems, nodes, bridges, amplifiers, splitters, trunks, and other devices, coupled with one another via cables (e.g., coaxial or fiber-optic) and/or via wireless ports, for example, such that signals having a spectrum are exchanged by the network devices.

As used herein, a "readable device" is intended to include any device (e.g., a router, a node, a DOCSIS modem, a digital modem, a cable modem, an internet modem, a DSL modem, an Ethernet modem, a network bridge) coupled with a cable network which includes at least one chip or a chipset configured to measure, process, and transmit data indicative of a full-spectrum or at least a video spectrum of signals received at the readable device automatically (e.g., continuously, intermittently, and/or on a preset schedule) and/or in response to a query or request transmitted to the readable device over a network.

As used herein "node sweep" includes obtaining a reference measurement or reading via testing equipment connected with a node or a readable device at the location of the node or readable device to determine differences in radio frequency (RF) performance at one or more nodes or readable devices along a network.

Further, as used herein any reference to "one embodiment" or "an embodiment" means that a particular element, feature, structure, or characteristic described in connection with the embodiment is included in at least one embodiment of the present disclosure. The appearances of the phrase "in one embodiment" in various places in the present disclosure are not necessarily all referring to the same embodiment, although the inventive concepts in the present disclosure are intended to encompass any and all combinations, subcombinations, and permutations of the features described or inherently present herein.

Embodiments of the present disclosure provide business and operational intelligence to network operators for spectrum data including at least one of telephony, internet, video, and combinations thereof, from a remote location. Advanced diagnostics according to embodiments of the present disclosure have the ability to capture the entire downstream spectrum and its data, and can monitor, capture, and analyze on a per device basis data such as frequency, modulation error ratio (MER), signal level, correctable/uncorrectable errors, bit error ratio (BER), signal-to-noise ratio (SNR), channel equalization monitor, frame lock, and quadrature amplitude modulation (QAM) constellations, for example.

In some embodiments, parameters can be configured to narrow the focus of the spectrum data being analyzed. The spectrum can be viewed or certain spectral maps can be constructed to look at sections of the whole; the frequency, the span of the search, the amplitude, the bandwidth, and the channel power measurements may be modified to focus in on certain sections of the spectrum. Over time, network operators can determine which issues in the cable network have what impact on specific services and can give higher priority to issues with greater impacts on customers when troubleshooting and alarming. When trends expose themselves based on the aggregation of similar issues, escalation rules can be implemented within a toolset of data analysis rules to make the right decisions promptly.

For example, various RF-signal issues can have different impacts on the services delivered throughout the access network. Having the ability to capture data at various points in the network will allow the network operator to categorize service-impacting issues based on RF impairments. RF impairments that can be discovered remotely by customer premise equipment (CPE)-based system analytics (SA) toolsets can be proactively resolved before larger more global issues become customer-impacting. Problems that can be resolved due to continuous monitoring and correlation of the data include but are not limited to a bad amplifier module, old and/or faulty cable network equipment due to aging and environmental stress, poor customer premises wiring due to poor quality coaxial cable, broadcast outages, reversed splitters and improper filter installation, overdriven QAMs, faulty taps and amps due to damage, or superfluous signal ingress, for example.

Through appropriate toolsets, statistics can be collected throughout the neighborhood, node, and further upstream in the cable network to detect where exactly the problem is occurring. Network operators can determine if problems are local to the customer premises, the distribution leg, the node, or the larger cable network. When separate, seemingly disparate small issues can be consistently captured, large problems in the cable network become evident and may be fixed in a directed, preemptive manner. Advanced data analysis tools can comb through data indicative of iterations of an operational status of a "cable line" and diagnose exactly where the problem is and subsequently dispatch a technician to the correct spot and resolve the issue promptly.

Embodiments of the present disclosure enable network operators to remotely "fingerprint" customer premises in a node serving area to attain a spectral baseline for products. The spectral baseline data can be compared against various iterations of the spectral data from customers' MIB files. The comparison of the spectral baseline to iterations of live customer data according to embodiments of the present disclosure facilitates the proactive monitoring of customer premises passed in the network operators' footprint, while delivering predictive analytics that cultivate preventative maintenance. Using the application based data analysis described herein, embodiments of the present disclosure provide network operators with meaningful customer data correlation and competitive differentiation.

Referring now to FIG. 1, shown therein is an exemplary embodiment of a cable network 100 according to the present disclosure. The cable network 100 may include at least one headend 102, at least one node 104, and a plurality of readable devices 106 coupled with the at least one node 104. The cable network 100 is shown as a hybrid fiber-optic-coaxial cable network 100 and may include one or more fiber optic cables 108 connecting the headend 102 with at least one or more node(s) 104, and one or more coaxial cables 110 connecting the at least one node 104 with the plurality of readable devices 106.

The plurality of readable devices 106 may be connected to the at least one node 104 via one or more distribution legs 107 with each of the one or more distribution legs 107 connecting a set of one or more of the plurality of readable devices 106 to at least one node 104, for example. As will be appreciated by persons of ordinary skill in the art having the benefit of the instant disclosure, each node 104 may be segmented for capacity purposes into two or more distribution legs 107. Each of the two or more distribution legs 107 may provide services to a distinct set of readable devices 106 coupled with the particular distribution leg 107.

One or more optional signal amplifiers 112 may be coupled with the one or more coaxial cables 110 and may amplify, or otherwise process signals transmitted over the cable network 100. As will be appreciated by persons of ordinary skill in the art, in some embodiments the cable network 100 may be implemented as a coaxial network, an optical network, a computer network, and combinations thereof.

The headend 102 includes at least one processor 114 coupled with a non-transitory processor-readable medium 116 storing processor-executable instructions and/or data organized in one or more databases as will be described below.

The at least one processor 114 can be implemented as a single processor 114 or multiple processors 114 working together to execute processor executable code including the logic described below. The processor 114 can be a digital signal processor (DSP), a central processing unit (CPU), a field programmable gate array (FPGA), an application-specific integrated circuit (ASIC) a microprocessor, a multi-core processor, and combinations thereof.

The processor 114 may be operably coupled with the non-transitory processor-readable medium 116 via a path 118 which can be implemented as a data bus allowing bi-directional communication of data and processor-executable code between the processor 114 and the non-transitory processor-readable medium 116, for example.

It is to be understood that in certain embodiments multiple processors 114 may be implemented and may be located remotely from one another, located in the same location, or comprising a unitary multi-core processor (not shown). The processor 114 is capable of reading and/or executing processor executable code or instructions stored in the non-transitory processor-readable medium 116 and/or of creating, reading, manipulating, altering, and storing data structures into the non-transitory processor-readable medium 116.

The non-transitory processor-readable medium 116 may be implemented as a non-transitory computer memory, such as random access memory (RAM), a CD-ROM, a hard drive, a solid state drive, a flash drive, a memory card, a DVD-ROM, a floppy disk, an optical drive, and combinations thereof, for example, and may be physically co-located with the processor 114, or may be implemented as a "cloud memory" e.g., may be accessible by the processor 114 over a computer network such as the Internet or via the cable network 100. The non-transitory processor-readable medium 116 may include a spectrum database 120, which may include spectrum signal data (or master files) from readable devices 106 on the cable network 100 including at least one of the telephony spectrum, the internet spectrum, the video spectrum, and combinations thereof. In some embodiments, the spectrum database 120 may include data of the full spectrum or at least the video spectrum from the readable devices 106.

The non-transitory processor-readable medium 116 may also include a network operator database 121, which may include network operator data, such as all data resident to the network operator's daily operations, including billing data containing the network operator's customer attributes (e.g., street address, customer name, customer contact information, customer status, customer channel lineup or services package, other customer information), headend 102 and/or node 104 on the customer's premises, along with the appropriate details for the readable devices 106 (e.g., unique identifications data, model data, firmware and/or software data, and manufacturer data) and products and services, the cable network 100 topology, and channel lineup provided to the users of the cable network 100, for example. As will be appreciated by persons of ordinary skill in the art, the Consumer Electronic Association (CEA) has identified several standard channels, which are specific frequency or spectra to be transmitted over cable networks, such as the cable network 100. Each CEA standard channel typically includes several television or digital video channels bundled in the CEA standard channel and transmitted together. Different network operators may choose different groups of television or digital video channels to transmit in each CEA standard channel on their respective cable network 100. In some embodiments, network operator data stored in the network operator database 121 includes data indicative of which particular television or digital video channels are transmitted or bundled via each CEA standard channel in the cable network 100.

The headend 102 may further include at least one cable modem termination system (CTMS) 122 and a data poller 124 coupled with the CTMS 122 in some embodiments of the instant disclosure.

The CTMS 122 may be coupled with the headend 102 and with the fiber optic cable 108, and may function to terminate the plurality of readable devices 106. The CMTS 122 may be resident to the headend 102, and may terminate the readable devices 106, demodulate signals received from the readable devices 106, and feed an Ethernet switch with updates from the readable devices 106. For example, in some embodiments where the readable devices 106 are implemented as cable modems in compliance with DOCSIS specifications, the CTMS 122 may be used to provide high-speed data services to users via the plurality of readable devices 106. As will be appreciated by a person of ordinary skill in the art having the benefit of the instant disclosure, two or more, or multiple CTMS 122 may be implemented in some embodiments.

The data poller 124 may interface with the CMTS 122 and/or with the processor 114 and the non-transitory processor-readable medium 116 to collect Management Information Base (MIB) files including full-spectrum or at least video spectrum data from the readable devices 106 at configured or predetermined intervals throughout the day.

As will be appreciated by persons of ordinary skill in the art having the benefit of the instant disclosure, a MIB file as described herein is a virtual database used for managing the readable devices 106 and the CMTS 122 in a cable network such as the cable network 100, and may include full-spectrum data or at least video spectrum data for signals received from the readable devices 106. Network operators may determine the number of times per day that each readable device 106 is polled by the CMTS 122 to procure the spectrum data (e.g., as MIB files including full-spectrum data or at least video spectrum data from each readable device 106) and configure the data poller 124 accordingly (e.g., via a scheduler module or function). The data poller 124 may carry out the intraday polling of the readable devices 106 through the CMTS 122 and the node 104, and may store the resulting spectrum data files in the spectrum database 120.

In some embodiments, the data poller 124 pulls the spectrum data files including full-spectrum data or at least video spectrum data for cable operator customers with readable devices 106 installed on their premises. The spectrum data files from the readable devices 106 may be in hexadecimal and two-complement notation in some embodiments. Once the data poller 124 collects the MIB files from the CMTS 122 and the MIB files are processed, the processed spectrum data files from the MIB files are stored in the spectrum database 120 in the non-transitory processor-readable medium 116 (e.g., by the processor 114 and/or by the data poller 124) as will be described with reference to FIG. 3 below.

The headend 102 may act as a central office where television signals are received from numerous satellites, antennae, or fiber backbone networks, and are processed into cable spectrum (e.g., bundled into one or more CEA standard channels) and distributed downstream over the cable network 100. The headend 102 may also manage upstream video requests from readable devices 106, such as when a customer requests pay-per-view or on-demand content. Additionally, the headend 102 manages the computer systems, the CMTS 122, and various other databases, such as the spectrum database 120 and/or the network operator database 121, to provide Internet access, video services, and/or telephony services to cable network customers. In some embodiments, the headend 102 may include or may be coupled with additional equipment such as receiver decoders, off-air receivers, encoders, channel modulators, processors, and combiners, for example.

The node 104 can be implemented as a hybrid fiber-coaxial node configured to receive signals from the headend 102 through the cable network 100. During the transmission of signals from the headend 102, a media converter in the node 104 may convert optical signals received over the fiber optic cable 108 to radiofrequency (RF) signals which are transmitted to the plurality of readable devices 106 over the coaxial cables 110.

The plurality of readable devices 106 may be implemented as DOCSIS-compliant cable modems, network bridges, or routers, and may be configured to provide high-speed data delivery over the cable network 100 and to capture and transmit spectrum data files (e.g., including full-spectrum data or at least video spectrum data) for signals (e.g., RF-signals) received by the readable devices 106, which spectrum data files may be indicative of one or more performance aspects of a plurality of channels (e.g., plurality of television digital, or video channels bundled in a CEA standard channel) at the particular distribution leg 107 of the cable network 100 that each readable device 106 is connected to. As used herein, a DOCSIS-cable modem is configured to provide bi-directional data communication via RF channels on a hybrid fiber-coaxial (HFC) infrastructure.

The readable devices 106 may offer a common method for network operators' products to work together in a predictable manner. In some embodiments, the readable devices 106 may locally process captured raw full-spectrum or at least video-spectrum data to generate full-spectrum or at least video spectrum data files, such as via Fourier transforms carried out by on-chip memory and one or more local processors on the readable device 106, for example, and may stamp each spectrum data file with the media access control (MAC) address of the readable device 106 and/or with a timestamp indicative of the day and time the spectrum data file was captured. The readable devices 106 may also generate alerts in conjunction with noted spectrum variances on the readable device 106, and may stamp each alert with the media access control (MAC) address of the readable device 106 and/or with a timestamp indicative of the day and time the spectrum data file was captured by the readable device 106.

The readable devices 106 may then transmit the resulting spectrum data files to the headend 102, or to the CMTS 122 and/or data poller 124, automatically, in response to a request, or according to a preset schedule. In some embodiments, the full-spectrum data files may be transmitted as MIB files compliant with the requirements of the simple network management protocol (SNMP) as will be appreciated by persons of ordinary skill in the art having the benefit of the instant disclosure. It is to be understood that any desired format and/or protocol may be used to request, generate, and/or transmit the full-spectrum data files by the readable devices 106.

Embodiments of the present disclosure may include multiple hardware architectures and processes to procure the raw spectrum data (e.g., RF-signal full-spectrum or at least video spectrum and/or amplitude data) from the readable devices 106 and load the raw spectrum data, along with other applicable network operator data, into a database for analysis.

Figure 2:
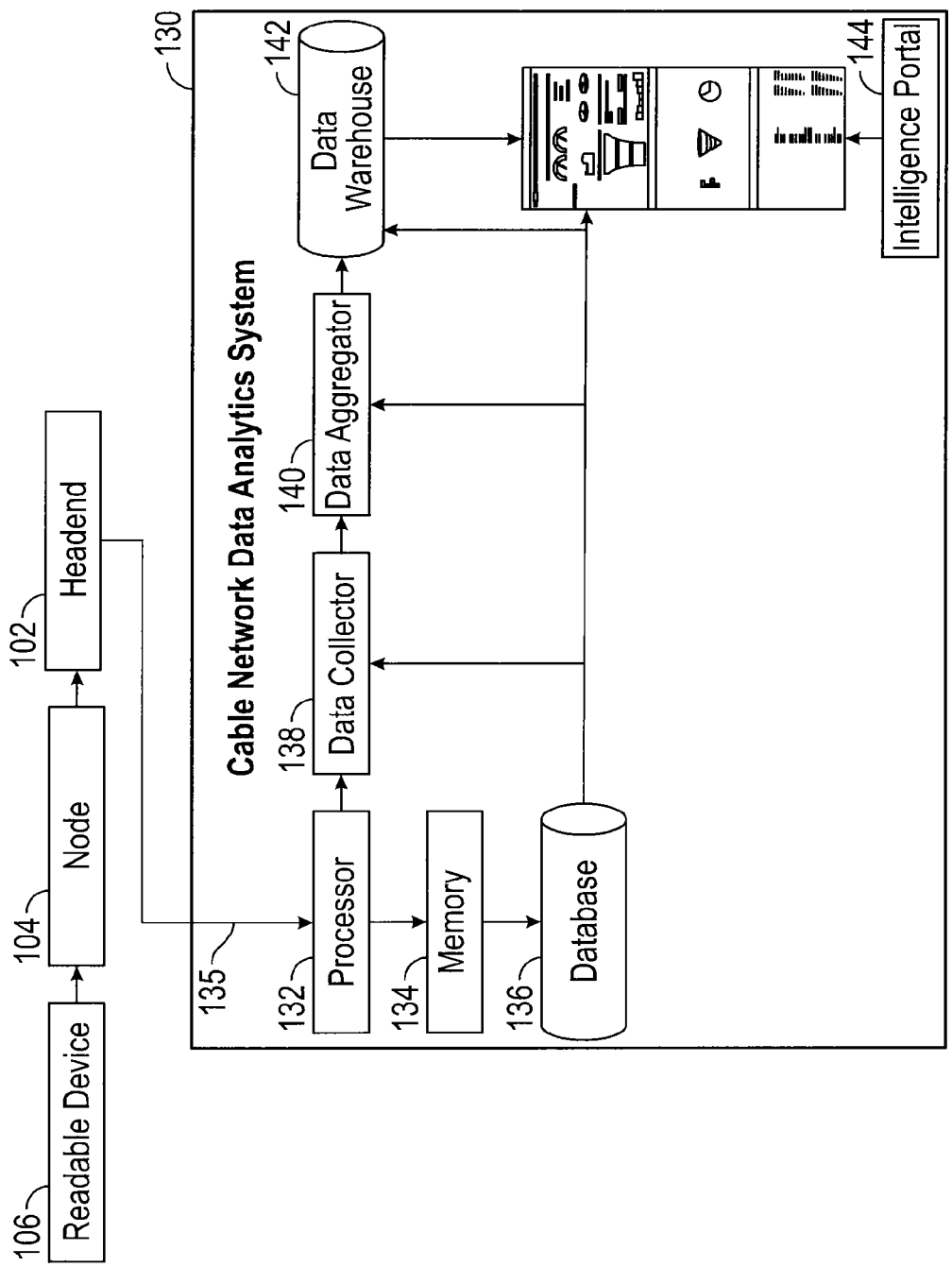
FIG. 2 is a diagram of an exemplary cable network data analysis system according to embodiments of the present disclosure.

Referring now to FIG. 2, shown therein is an embodiment of a cable network data analytics system 130 according to the present disclosure. The cable network data analytics system 130 may include at least one processor 132 coupled with a non-transitory processor readable medium 134 storing processor-executable code and a database 136. The cable network data analytics system 130 may also include a data collector 138, a data aggregator 140, a data warehouse 142, and an intelligence portal 144. As will be appreciated by persons of ordinary skill in the art having the benefit of the instant disclosure, while the data collector 138, the data aggregator 140, the data warehouse 142, and the intelligence portal 144 have been shown and will be described as separate devices including processors and non-transitory processor-readable mediums, in some embodiments one or more of the data collector 138, the data aggregator 140, the data warehouse 142, and the intelligence portal 144 may be implemented as software or firmware modules for causing the at least one processor 132 to execute the logic and functionality as will be described below. Further, in some exemplary embodiments one or more of the data collector 138, the data aggregator 140, the data warehouse 142, and the intelligence portal 144 may be omitted, and the respective functionality may be carried out by the at least one processor 132.

Referring to FIGS. 1 and 2, the at least one processor 132 may be implemented similarly to the processor 114 and is shown as configured to receive data from the spectrum database 120 and/or from the network operator database 121 stored in the non-transitory processor-readable medium 116 of the headend 102 via a communication path 135. The communication path 135 may be implemented as a data bus, a wireless connection, a computer network, a wired connection, a computer port, and combinations thereof. Further, in some embodiments, the communication path 135 may not be continuous. For example, a file or portion of the database 120 and/or 121 can be exported from the respective database 120 and/or 121, and then imported into the database 136, such as by using a portable computer memory or transferring the exported information over a communications network.

The non-transitory processor-readable medium 134 may be implemented and function similarly to the non-transitory processor-readable medium 116, for example.

The database 136 may include information and/or data accessed by the at least one processor 132 and/or otherwise obtained or provided from the spectrum database 120 and/or from the network operator database 121, along with other data and processor-executable code as will be described below.

In some embodiments, the cable network data analytics system 130 or one or more of the components thereof (e.g., the data collector 138, the data aggregator 140, the data warehouse 142, and the intelligence portal 144) may be physically co-located on the network operator's premises and/or under the network operator's control, while in some embodiments, the cable network data analytics system 130 or one or more of the components thereof may be located remotely from under the control of the network operator and/or a third party and may be configured to communicate with the headend 102 over any desired network such as the Internet. Further, in some embodiments, the network operator may export one or more files or information from the databases 120 and 121, and the exported information or file may be imported in the cable network data analytics system 130 (e.g., by being saved in the database 136), such as via a portable non-transitory processor readable medium, for example.

Figure 3:
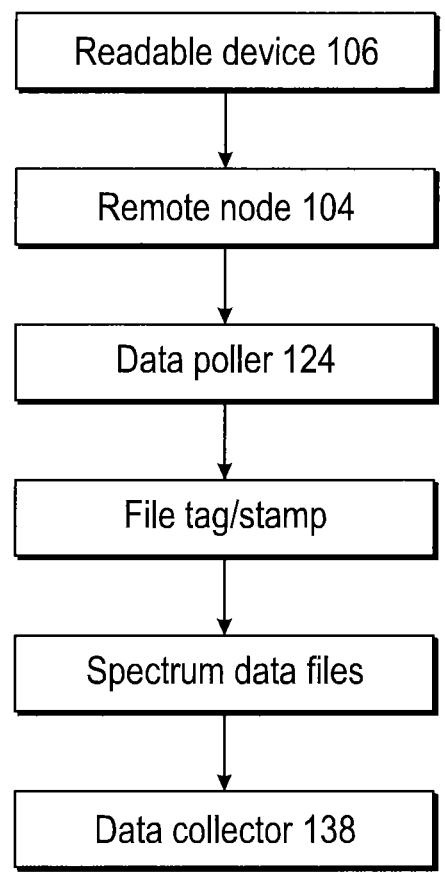
FIG. 3 is a flowchart illustrating an exemplary embodiment of a data poller functionality according to the present disclosure.

Referring FIGS. 1 and 3, in one embodiment the data poller 124 may function as follows. The data poller 124 may retrieve the spectrum data files (e.g., MIB files provided by the readable devices 106, indicative of the full-spectrum or at least the video spectrum and/or amplitude of signals received by the readable devices 106 over the cable network 100 and/or of one or more performance aspects of a plurality of standard channels at the readable device 106) from the readable devices 106. The network operator may determine any desired number of times (e.g., one, one or more, two, two or more, three, a plurality) per period of time (e.g., per hour, day, week, month, etc.) that the readable devices 106 are polled (e.g., by the CMTS 122) to procure their respective full-spectrum or at least video spectrum data files, and may configure the CMTS 122 and/or the data poller 124 accordingly. The data poller 124 may then begin with intraday polling of the readable devices 106 on the cable network 100, through the CMTS 122 and the nodes 104.

The data poller 124 may pull spectrum data files including full-spectrum or at least video spectrum data for network operator customers with a readable device 106 installed on their premises. The data poller 124 may temporarily save the spectrum data files to the CMTS 122. Each spectrum data file may be saved with a naming convention that includes the MAC address of the readable device 106 from which the respective spectrum data file was received along with the time stamp of the polling, e.g., "00B0D086BBF7_052613_0900", where "00B0D086BBF7" is the MAC address of the readable device 106, "052613" is the date (e.g., in mmddyy format), and "0900" is the time of day the spectrum data file was captured by the readable device 106. The spectrum data files may be stored in the spectrum database 120 and may be provided to the data collector 138 as will be described below.

The data collector 138 may be implemented as a stand-alone device having a processor and a non-transitory processor-readable medium storing processor-executable code, or may be implemented as one or more software and/or firmware module(s) for causing the at least one processor 132 to carry out the functionality of the data collector 138 described herein. The data collector 138 may pull spectrum data for the readable devices 106 from the spectrum database 120 and may aggregate the data into one or more fact and dimension data sets for analysis, which data sets may be stored in the database 136, for example, or in any other desired non-transitory processor-readable medium. As used herein fact tables may be generally numeric and may include measurements, metrics, and/or business events or states such as readable device 106 IDs and spectrum data for each readable device 106, for example. Dimension tables store and contain information to qualify and/or interpret facts and may be designed to include dimension keys, descriptive attributes, and values such as readable device 106 MAC address, location, node 104 ID, for example.

Figure 4:
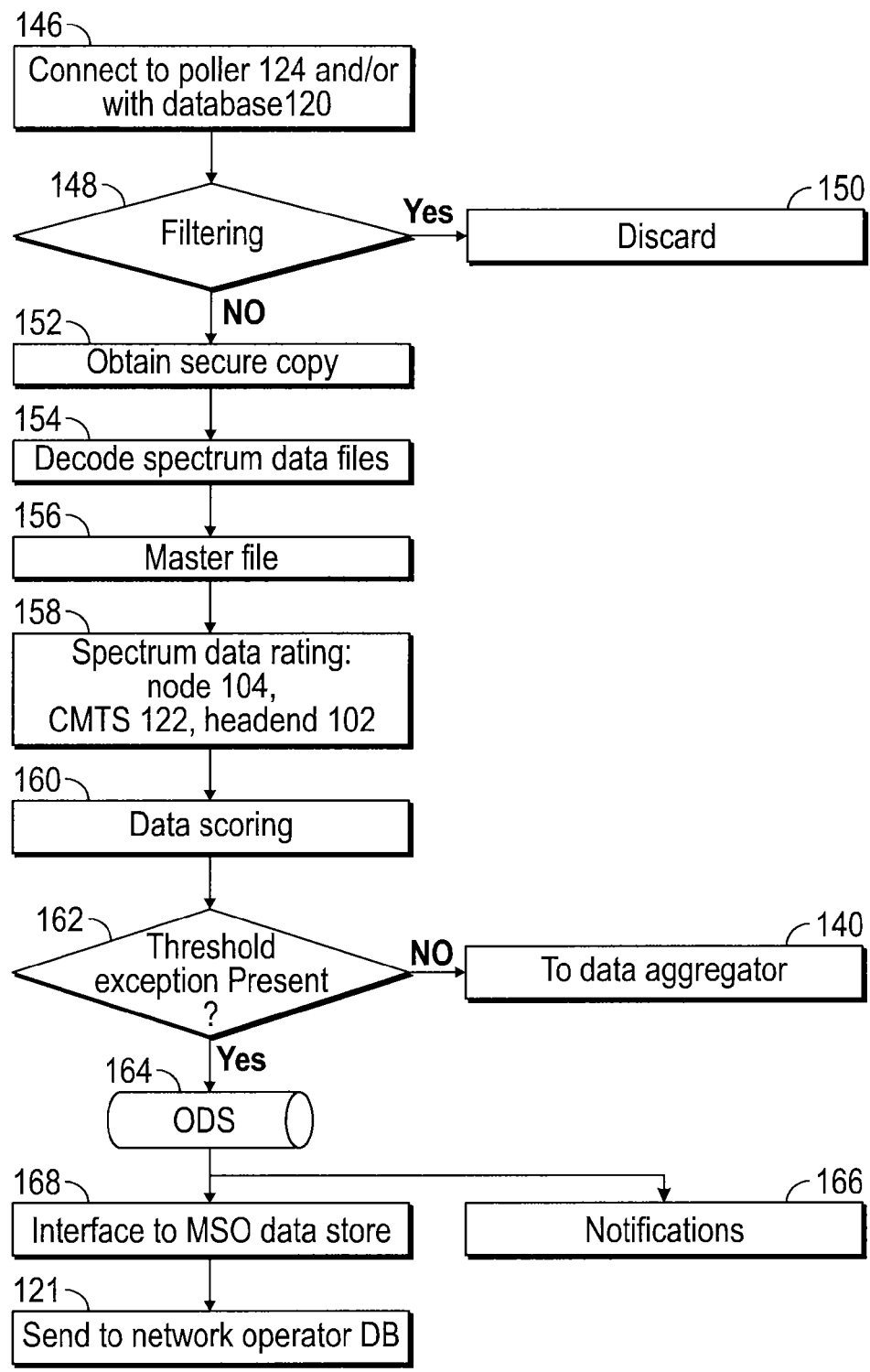
FIG. 4 is a flowchart illustrating a data collector functionality of a cable network data analysis system according to exemplary embodiments of the present disclosure.

Referring now to FIG. 4, in one embodiment a method of data collection carried out by the data collector 138 may include one or more of the following steps.

In a step 146, the data collector 138 may interface, connect, or may otherwise be coupled with the data poller 124 and/or with the databases 120 and 121 (e.g., via the communication path 135), so that the data collector 138 communicates with and accesses the spectrum data files stored in the spectrum database 120 and/or receives the spectrum data files from the data poller 124.

In a step 148, the spectrum data files may be filtered by the data collector 138 to determine if the spectrum files are the most current spectrum data files and are appropriately timestamped and named. Any spectrum data file without an appropriate file name, or found to already exist in the data collector 138 may be discarded in a step 150.

At least one, one or more, two or more, a plurality, or all appropriate spectrum data files from the database 120 and/or obtained by the data poller 124 may be transferred, securely copied, or otherwise accessed by, or provided to, the data collector 138 (e.g., pushed to the data collector 138, or pulled by the data collector 138) in a step 152.

In a step 154, the spectrum data files may be routed by the data collector 138 through a suitable decoding protocol to convert the spectrum data files from their original hexadecimal format to a decimal notation. This step may be omitted or modified as appropriate in some embodiments where the spectrum data files are in a format other than a hexadecimal format, for example.

In a step 156, data from the spectrum data files may be parsed, sorted, and appended to master data files which may be categorized by CMTS 122 and/or by node 104, and may be stored by the data collector 138.

In a step 158, fact tables may be generally numeric and contain the measurements, metrics or business events or states. Dimension tables may store and contain information to qualify and/or interpret facts and are designed to contain dimension keys, descriptive attributes, and values. Where the data is stored as data tables, each row of the data may be tagged with the appropriate node 104, CMTS 122, and headend 102 values, and/or may be stored in an appropriate directory tree of the data warehouse 142 by the data aggregator 140 as will be described below.

In a step 160, the data collector 138 may store the master spectrum data files to enable a practice called early event detection, to ascertain in advance of processing, whether certain threshold anomalies exist in the master spectrum data files (e.g., whether the performance aspects of the plurality of standard channels meet predetermined performance requirements). For example, threshold anomalies may include the presence of data irregularities within the video spectrum that indicate video signal degradation. Predetermined performance aspects may also include the failure to meet standard threshold values or transmit complete frequency ranges.

In a decision step 162, rows of data that are found devoid of any significant threshold anomalies may be transmitted to the data aggregator 140 for the next round of processing as will be described below. Any rows of data within the master spectrum data files which show significant threshold anomalies or other exceptions may be transmitted into an operational data store (ODS) 164 (e.g. a partition in the non-transitory processor-readable medium 134 or a separate memory) of the data collector 138 for further processing.

In a step 166, one or more notifications (e.g., visual, audible, haptic, etc.) may be provided to the appropriate personnel as defined by the network operator, who may review and troubleshoot the exceptions stored within the ODS 164. Notifications empower network operators to mitigate potential signal issues as soon as they are discovered, to prevent such issues from impacting the network operators' customers.

In a step 168, the threshold exceptions stored within the ODS 164 may be transmitted to the network operator database 121 for inclusion in any applicable internal processes and toolsets as desired by individual network operators.

The data aggregator 140 may be implemented as a stand-alone device having a processor and a non-transitory processor-readable medium storing processor-executable code, or as one or more software and/or firmware module(s) for causing the at least one processor 132 to carry out the data aggregator 140 functionality described herein.

Figure 5:
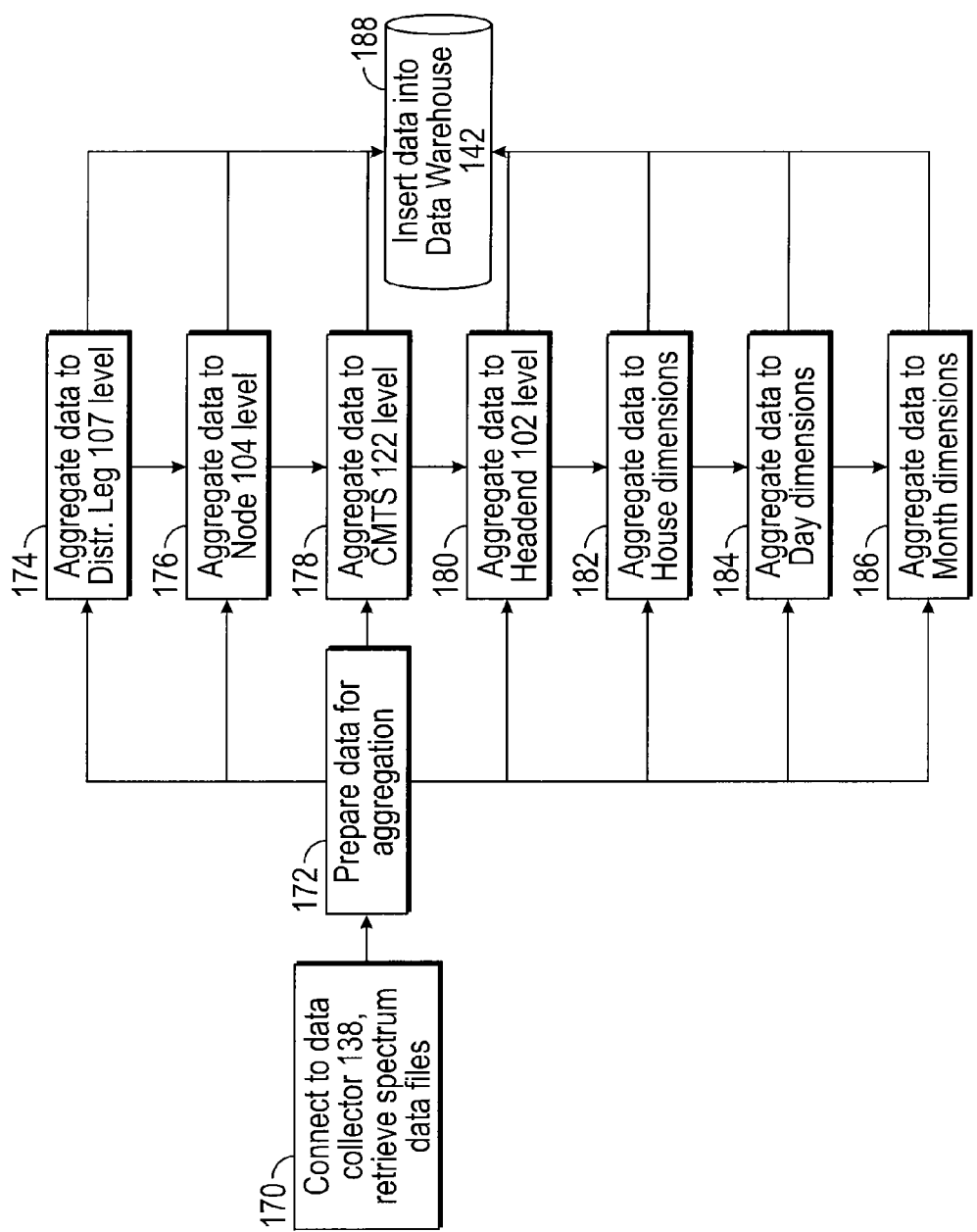
FIG. 5 is a flowchart illustrating a data aggregator functionality of a cable network data analysis system according to exemplary embodiments of the present disclosure.

Referring now to FIG. 5, an exemplary embodiment of a data aggregator 140 functionality method is described therein.

The data aggregator 140 may pull data (e.g., the one or more fact and dimension data sets) from the data collector 138 at scheduled intervals, and may store the data into the data warehouse 142, for example. The data aggregator 140 may also acquire data feeds from a network operator's billing data warehouse (not shown) including data about the network operator's customers and their locations, readable devices 106, products and standard and/or television channel lineups.

In a step 170, the data aggregator 140 may connect to the data collector 138, to retrieve the master spectrum data files that were created by the data collector 138 as described above. The data aggregator 140 may store the master spectrum data files into the data warehouse 142.

In a step 172, the data aggregator 140 may prepare the master spectrum data files for aggregations that will amass data into usable groupings once it is transmitted to the data warehouse 142.

For example, a first level of aggregation 174 of the master spectrum data files may be at the distribution leg 107, to allow network operators to query the master spectrum data files via a distribution leg 107 identifier to assist network operators in isolating issues to a more finite level once all the data is resident to the intelligence portal 144. In addition to assisting with capacity segmentation, another benefit to segmenting the node 104 into multiple distribution legs 107 is to assist the network operator's engineers in isolating issues during troubleshooting efforts.

Another level of aggregation 176 of the master spectrum data files may be at the node 104 level (e.g., to allow querying by node 104 identifier). As noted above, network operators transmit video signal (e.g., a plurality of television or digital video channels bundled in a standard channel such as a CEA standard channel) from the headend 102 through the cable network 100 to deliver their products and services to their customers' premises. Aggregating the master spectrum data files at the node 104 level may assist network operators in determining the segment of the cable network 100 in which the readable device 106 is resident, for example.

Another level of aggregation 178 of the master spectrum data files may be at the CMTS 122 level. Aggregating the master spectrum data files at the CMTS 122 level may isolate for network operators which of the many CMTS' 122 within the headend 102 are serving particular readable devices 106 at issue.

Another level of aggregation 180 of the master spectrum data files may be at the headend 102 level. Each network operator may operate numerous headends 102 across their customer footprints at which they receive, process and distribute signals for their products and services. Accordingly, data within the intelligence portal 144 may be advantageously aggregated at the headend 102 level for comparative analysis purposes.

Further levels of aggregation of the master spectrum data files may be temporal—e.g., at the hour, day, and/or month dimensions 182, 184, and 186 respectively. It is advantageous within the intelligence portal 144 to provide analytics that are summarized in varying levels of periodicity. The hour dimension 182, the day dimension 184, and the month dimension 186 may support rich analytics at recurring intervals within the data analytics portal 144 as will be described below.

In a step 188, the aggregated master spectrum data files according to one or more of the above levels of aggregation may be transmitted to the data warehouse 142 for storage and/or further processing and analysis as will be described below.

The data warehouse 142 may be implemented as a stand-alone non-transitory processor-readable medium, or as a partition in the non-transitory processor-readable medium 134 and/or in the database 136, for example, and may function as a central data repository for the intelligence portal 144 as will be described below. In some embodiments, multiple data marts may be constructed in the data warehouse 142 to store slices or portions of data to transmit data more efficiently to the intelligence portal 144. Examples of some of the data marts that may exist within the data warehouse 142 include a time data mart to enable analysis by multiple periodicities, a billing data mart to enable analysis by the data attained from a network operator's billing data warehouse, and a cable network data mart to enable analysis by the network operators' cable network 100 topography such as headend 102, CMTS 122, node 104, and combinations thereof.

Figure 6:
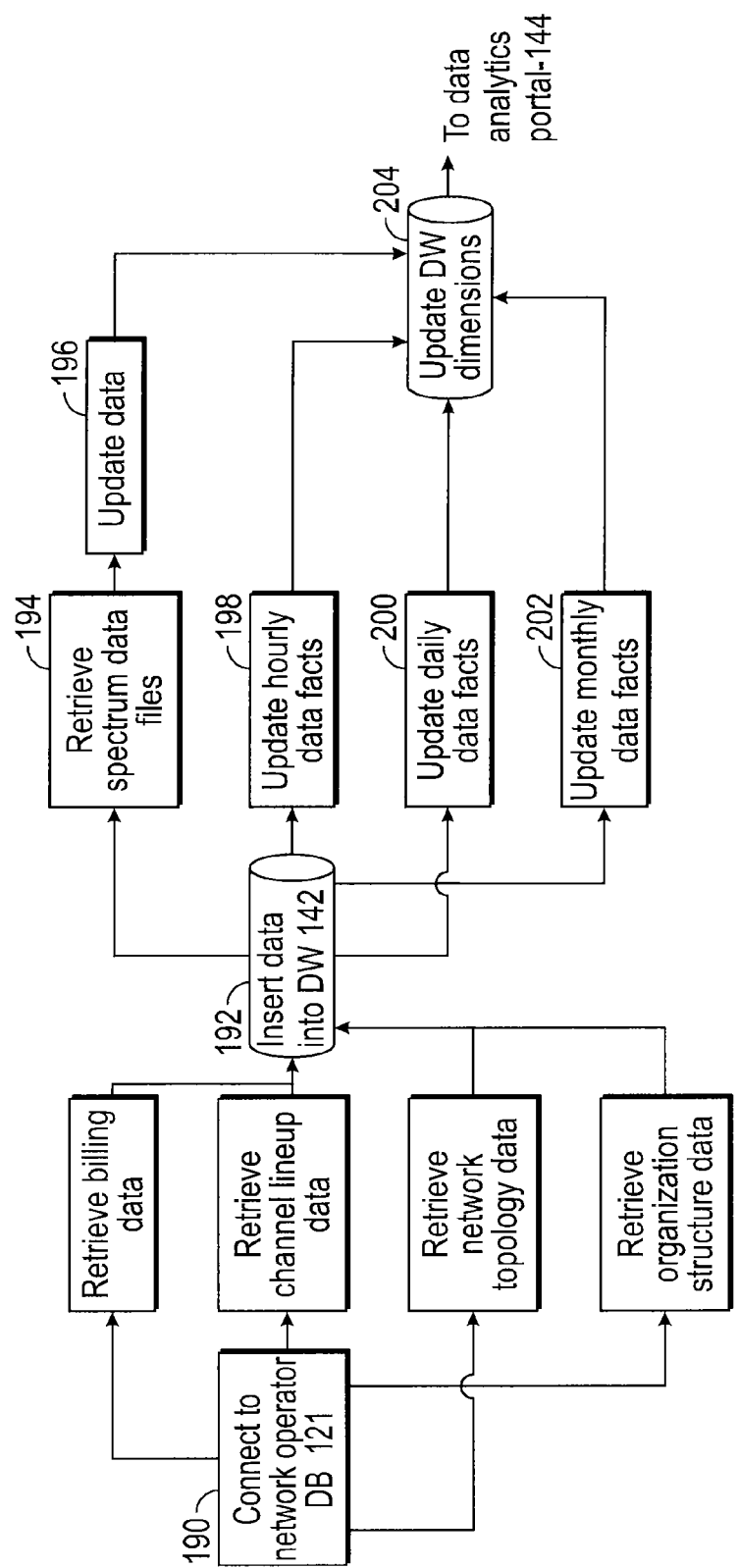
FIG. 6 is a flowchart illustrating a data warehouse functionality of a cable network data analysis system according to exemplary embodiments of the present disclosure.

Referring now to FIG. 6, one embodiment of a method of data processing at the data warehouse 142 may begin at step 190 with the data warehouse 142 accessing data from the network operator database 121. Data accessed from the network operator database 121 may include all data resident to the network operator's daily operations that is useful in embodiments of the present disclosure to enrich and further aggregate the master spectrum data files. For example, billing data, channel lineup data, network topology data, and organizational structure data may be accessed from the network operator database 121.

In a step 192, one or more, or all of these data sets may be inserted into the data warehouse 142 for storage and processing.

In a step 194, the data warehouse 142 connects to the data aggregator 140, to retrieve the master spectrum data files.

In a step 196, the data warehouse 142 updates its data, which may include retrieving master spectrum data files and updating data warehouse 142 facts. Further steps may include retrieving hourly, daily, and monthly facts and updating the data warehouse 142 hourly facts in a step 198, daily facts in a step 200, and monthly facts in a step 202, for example.

In a step 204, a data warehouse 142 dimension table that qualifies, quantifies, and/or interprets the facts as described above may be stored and/or updated by the data warehouse 142. The data warehouse 142 dimension table may be used to configure data into a usable format for the presentation of metrics and information in the intelligence portal 144 according to some embodiments of the present disclosure.

As will be appreciated by persons of ordinary skill in the art having the benefit of the present disclosure, additional network operator datasets from the network operator database 121 are useful in enriching the spectrum data to provide meaningful analytics. For example, by procuring the customer's MAC addresses, locations, and product data, and linking to the intraday spectrum data, it is possible to provide a readable device 106 health report indicative of a geographic readout of internet and telephony spectrum performance for customer premises with readable devices 106 resident to the customer premises, and the same geographical readout can be provided on video spectrum performance for any customer premises with a readable device 106 as will be described with respect to FIGS. 11-13 below.

The intelligence portal 144 may be implemented as a stand-alone computer system such as a web-server or a computer terminal, or may be implemented as a software or firmware module for causing the processor 132 to carry out the functionality of the intelligence portal 144 described herein. The intelligence portal 144 may be accessible over a computer network by network operators and may provide network operators with spectrum intelligence at a variety of levels such as a regional and individual customer level from a remote location (e.g., via a graphical user interface, via a native software application making data calls to the intelligence portal 144, and/or via a website accessible by the network operator via a browser). The analytics and functionality provided within the intelligence portal 144 may allow network operators to establish, analyze, and troubleshoot detailed empirical data regarding network health and consequently their customers' experience, for all products, as will be described below. The interaction with and use of the data in the data warehouse 142 by the intelligence portal 144 may provide one or more graphical user interfaces, web pages, or screens to users (e.g., network operators or their agents or employees), and may include a variety of reports, metrics, charts, and alerts that will be explained in more detail below.

In some embodiments, the intelligence portal 144 may not store data used for the presentation of analytics, and may instead retrieve the data from the data warehouse 142 as needed, including data such as spectrum data files, billing data, network operator organizational structure, cable network 100 topology, and channel lineup data, for example. For ease of use and faster response time within the intelligence portal 144, billing data may be broken into smaller categories, such as by customer, customer premises, readable device 106, services, or combinations thereof.

Users of the intelligence portal 144 according to some embodiments of the present disclosure may perform trending analysis through the intelligence portal 144 to assist with troubleshooting issues with the RF-spectrum. Further, users of the intelligence portal 144 according to some embodiments of the present disclosure may make data calls to the data warehouse 142 from the intelligence portal 144 to attain aggregated historical information specific to a customer's readable device 106, customer premises, node 104, headend 102, or combinations thereof, for example.

A further step within the troubleshooting capabilities provided to users may include interacting directly with the readable devices 106 of the network operator's customers through the intelligence portal 144 according to some embodiments of the present disclosure, via one or more utility run requests. Utility run requests to readable devices 106 in the cable network 100 may include trace routes (to measure the path and any corresponding packet delays across the cable network 100), SNMP walks (to query a readable device 106 for a tree of information), HTTP gets (to retrieve data from the readable device 106) and other scripts as desired, for example.

Another functionality of the intelligence portal 144 may allow end users of the intelligence portal 144 to input notes, resolutions, comments etc., regarding their troubleshooting efforts within the intelligence portal 144. The problems, solutions, comments, and notes may be transmitted to the ODS 164 of the data collector 138 for further analysis, processing, and archiving.

Figure 7:
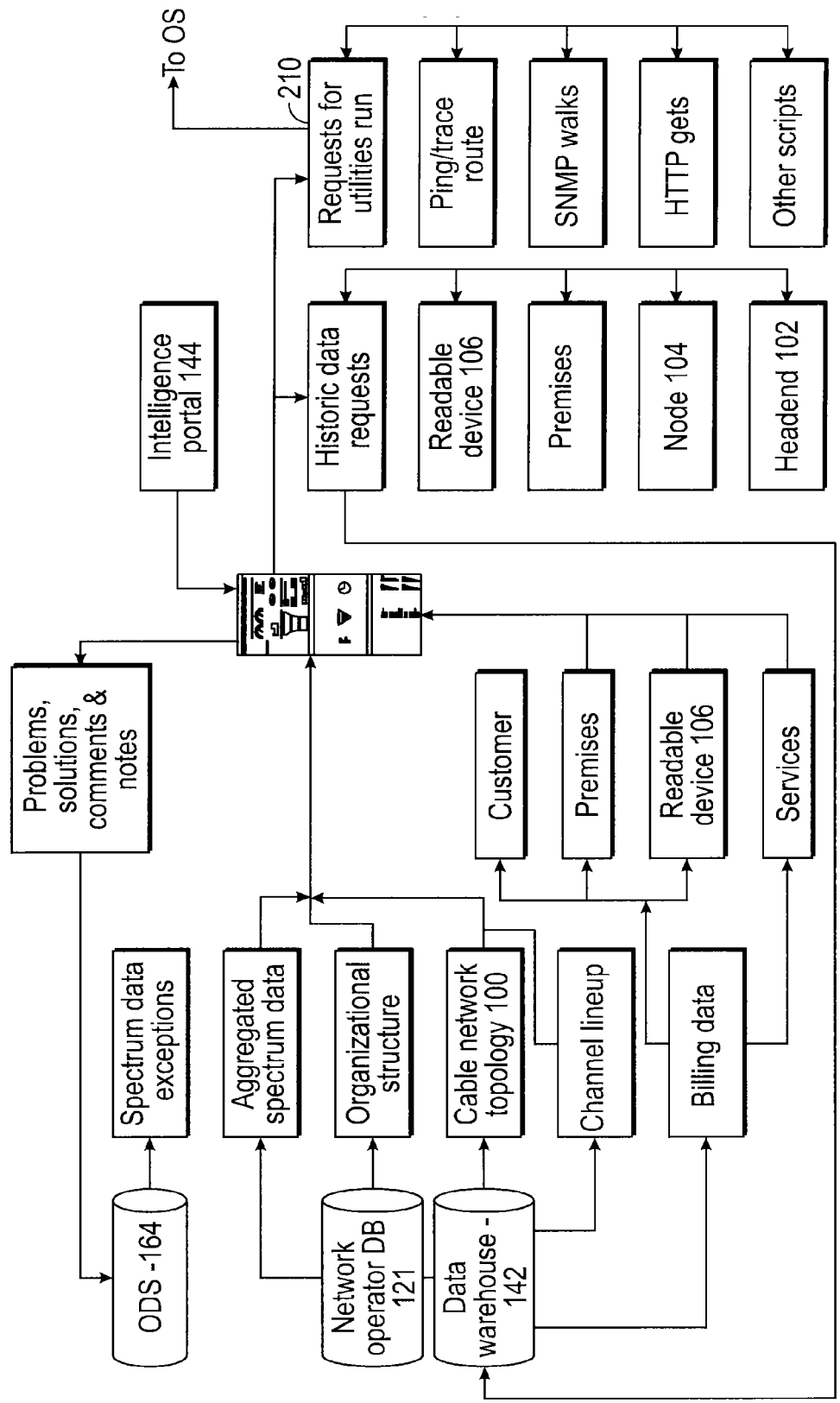
FIG. 7 is a flowchart illustrating a business intelligence method provided by an intelligence portal of a cable network data analysis system according to exemplary embodiments of the present disclosure.

Referring now to FIG. 7, shown therein is a flowchart illustrating a business intelligence functionality provided by an intelligence portal 144 of a cable network data analytics system 130 according to exemplary embodiments of the present disclosure. The intelligence portal 144 may allow a user, such as the network operator, to interface with a variety of data sources, including the ODS 164, the network operator database 121, and the data warehouse 142. For example, the intelligence portal may retrieve or access data indicative of the spectrum data file exceptions from the ODS 164. The intelligence portal 144 may obtain or access network operator data from the data warehouse 142 and/or from the network operator database 121, such as aggregated spectrum data, organizational structure of the network operator, topology of the cable network 100, channel lineup of the cable network 100, billing data for the customers of the network operator, or combinations thereof. In some examples, the billing data may include customer identity, customer premises address, location, type (e.g., residential, multi-unit, business), identification of readable device(s) 106 for a particular customer (e.g., MAC address), and services provided to a particular customer, customer premises, or readable device 106 by the network operator.

Further, in some embodiments historical data requests may be transmitted to the data warehouse 142 and/or to the network operator database 121, and may include requests for historical data for readable device(s) 106, customer premises, node(s) 104, headend(s) 102, or combinations thereof.

Figure 8:
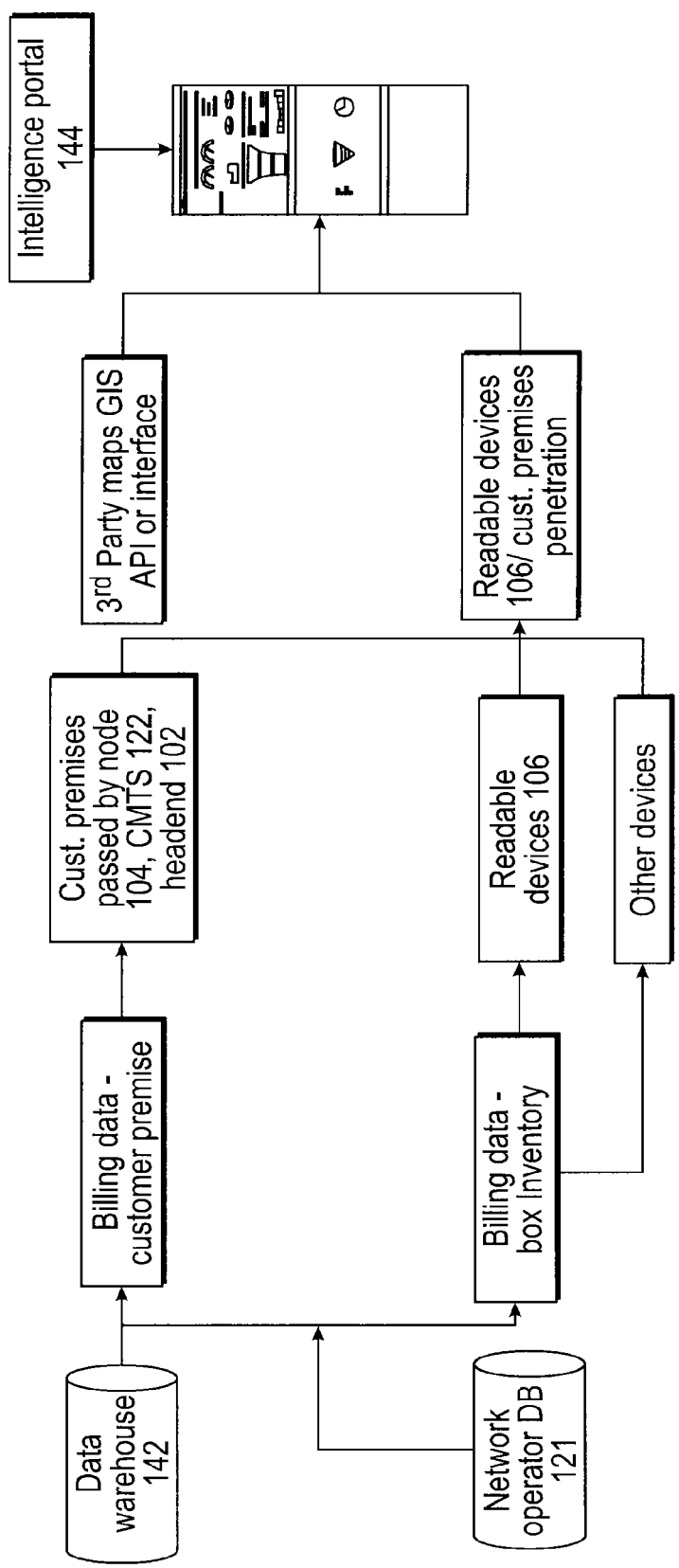
FIG. 8 is a flowchart illustrating a readable device penetration functionality provided by an intelligence portal of a cable network data analysis system according to exemplary embodiments of the present disclosure.

Referring now to FIG. 8, shown therein is a readable device 106 penetration functionality of an intelligence portal 144 according to some embodiments of the present disclosure. The intelligence portal 144 may retrieve, or access data from the data warehouse 142 and/or from the network operator database 121 indicative of billing data for customer premise locations serviced by the cable network 100 and/or device inventory distributed to customer premise locations serviced by the cable network 100, for example.

The billing data for customer premise locations serviced by the cable network 100 may be indicative of customer premises passed by each node 104, CMTS 122 and/or headend 102 coupled with the cable network 100. The readable device 106 inventory data may be indicative of readable devices 106 distributed to customer premises serviced by the cable network 100 and/or other devices configured to capture partial spectrum data (e.g., internet and telephony spectrum data, but not video spectrum data), and may include readable device 106 manufacturer and model, current firmware or software version of readable devices 106, and/or other readable device 106 specific data. The readable devices 106 coupled with the cable network 100 may be combined with the customer premise information to determine readable device 106/customer premise penetration by the intelligence portal 144, for example. The readable device 106 customer premise penetration information may be combined or correlated with map data (e.g., from a third party GIS API or interface) by the intelligence portal 144 in some embodiments.

Figure 9:
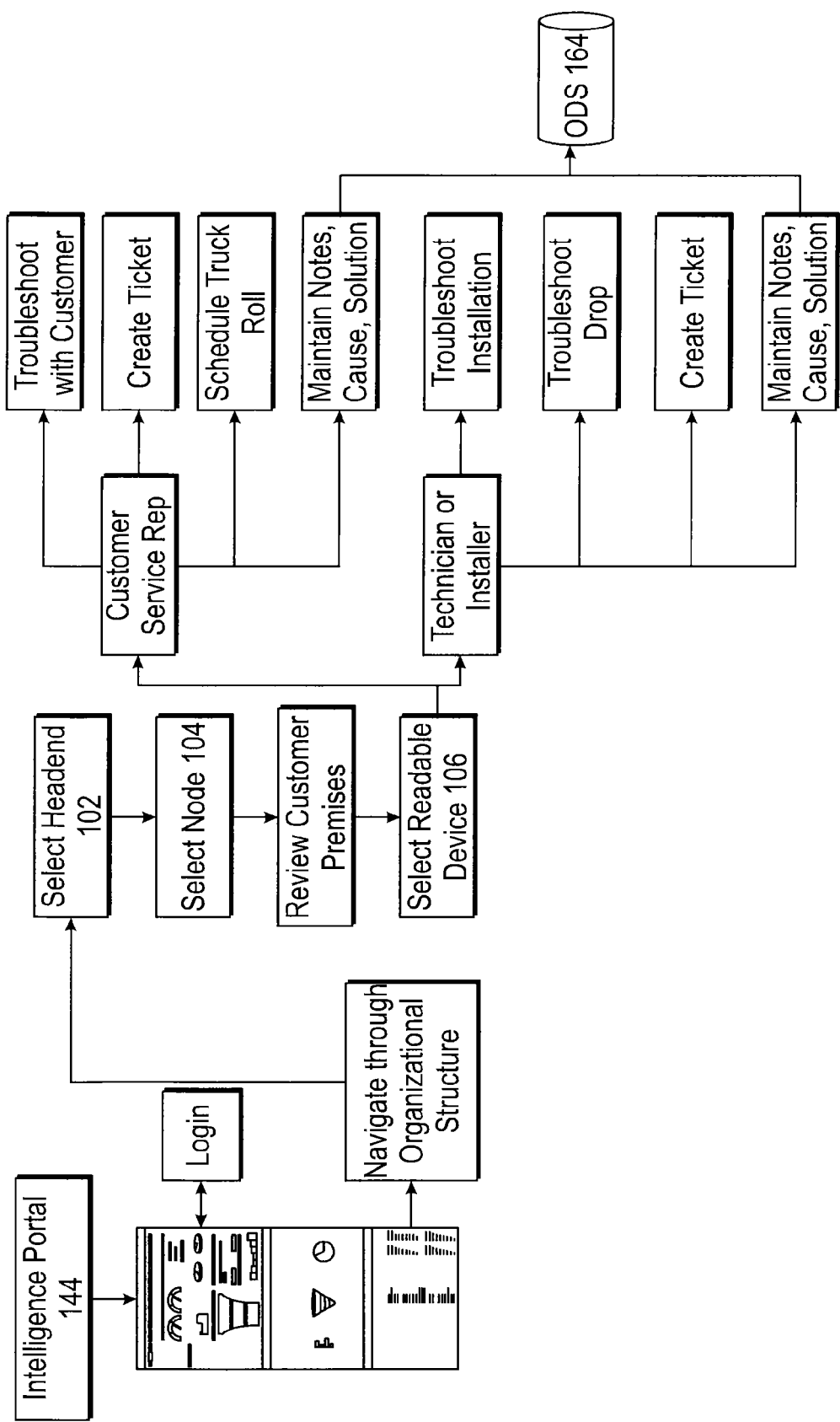
FIG. 9 is a flowchart illustrating operational intelligence functionality provided by an intelligence portal of a cable network data analysis system according to exemplary embodiments of the present disclosure.

Referring now to FIG. 9, shown therein is an embodiment of operational intelligence functionality provided by an intelligence portal 144 according to the present disclosure.

The intelligence portal 144 may be securely accessed by a user, such as network operators, by logging into the intelligence portal 144, or by otherwise being authenticated by the intelligence portal 144, for example.

The user may use the intelligence portal 144 to navigate through the organizational structure of the network operator and/or the cable network 100, for example. Navigating through the organizational structure may include selecting a headend 102, a node 104, and reviewing the customer premises served by the selected headend 102 and the selected node 104. In some exemplary embodiments, the customer premises may be graphically represented as icons on a map, which may be selected by the user. The user may also select one or more readable devices 106, for which the corresponding spectrum data files include an exception or a threshold anomaly identified by the data collector 138 as described above.

The intelligence portal 144 may provide a notification to a customer service representative and may allow the customer service representative to troubleshoot the readable device 106 with a customer, create a ticket, schedule a service call or a service truck roll, and take notes (e.g., customer comments, cause of the exception and solution of the exception), all or which may be stored in the ODS 164, for example.

In some embodiments, the intelligence portal 144 may provide a notification to a technician or installer (e.g., accessing the intelligence portal 144 in the field via a portable device) and may allow the technician or installer to troubleshoot the installation of the readable device 106, troubleshoot the service drop coupling the readable device 106 with the cable network 100, create a ticket, and take notes (e.g., customer comments, cause of the exception and solution of the exception), all or which may be stored in the ODS 164, for example.

Figure 10:
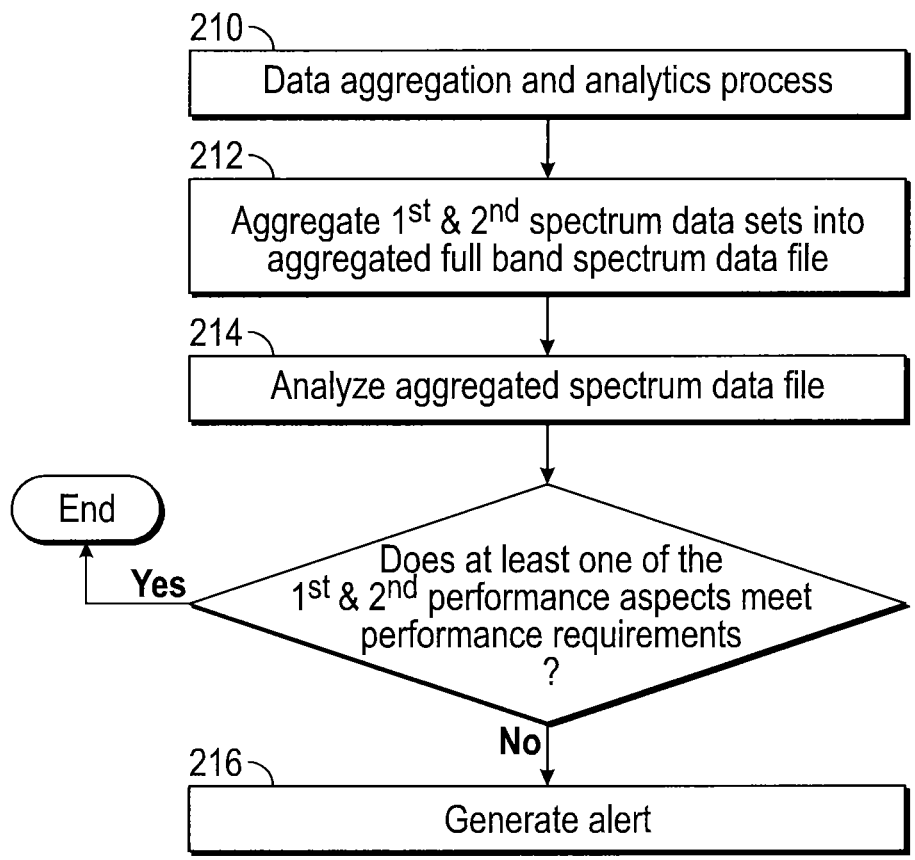
FIG. 10 is a flowchart illustrating an exemplary embodiment of an aggregation functionality of a cable network analysis system according to the present disclosure.

Referring now to FIG. 10, shown therein is an exemplary embodiment of a data aggregation and analytics process 210 carried out via the cable network data analytics system 130 according to the present disclosure. At least one processor, such as the processor 132 may access processor-executable code stored in a non-transitory processor-readable medium such as the non-transitory processor-readable medium 134, the processor-executable code may cause the at least one processor to carry out the following steps.

In a step 212, the at least one processor 132 may aggregate a first spectrum data set and a second spectrum data set into an aggregated spectrum data file. The aggregated spectrum data file may be stored in a non-transitory processor-readable medium such as the non-transitory processor-readable medium 134. In some embodiments, the first spectrum data set may be indicative of spectrum data from a first readable device 106 connected to a first line (e.g., a distribution leg 107 and/or a coaxial cable 110) of the cable network 100 and including video spectrum data indicative of first performance aspects (e.g., RF impairments and/or threshold exceptions such as frequency suck-outs, standing waves, ingress, SNR) of a plurality of standard channels (e.g., CEA standard channels including multiple television, video, or digital video channels bundled therein) at the first line of the cable network 100. Similarly, the second spectrum data set may be indicative of spectrum data from a second readable device 106 connected to a second line of the cable network 100 and including video spectrum data indicative of second performance aspects of the plurality of standard channels at the second line of the cable network 100.

In a step 214, the at least one processor 132 may analyze the aggregated spectrum data file with a predetermined logic to determine whether the at least one of the first and second performance aspects meet predetermined performance requirements (e.g., whether predetermined RF impairments or threshold spectrum exceptions exist).

In a step 216, the at least one processor 132 may generate an alert indicative of at least one of the first and second performance aspects not meeting the predetermined performance requirements. The alert may be provided to a user in any desired manner, such as via one or more audible, visual, and/or haptic stimuli, and may be presented by the intelligence portal 144 as a webpage, a computer screen, a graphical user interface, a report, an SMS message, an email, or combinations thereof, for example.

In some exemplary embodiments, the aggregated spectrum data file may be indicative of the first and second performance aspects at a first set of instances in time. Further, the predetermined performance requirements may be based at least in part on a spectrum data set including video spectrum data indicative of at least one of: one or more first service-impairment aspects of the plurality of standard channels at the first line of the cable network 100 at a second set of instances in time, and one or more second service-impairment aspects of the plurality of standard channels at the second line of the cable network 100 at the second set of instances in time. The second set of instances of time may be earlier than the first set of instances in time.

The alert may be further indicative of at least one of the plurality of standard channels at the first line of the cable network 100 not meeting the predetermined performance requirements. The alert may also be indicative of at least one of the plurality of standard channels at the second line of the cable network 100 not meeting the predetermined performance requirements.

In some embodiments the processor 132 may also analyze the first spectrum data (e.g., in real-time) from the first readable device connected to the first line of the cable network including video spectrum data indicative of the first performance aspects of the plurality of standard channels, a readable device baseline spectrum data file indicative of expected performance aspects of the plurality of standard channels at the first readable device and a reference device spectrum data file indicative of reference performance aspects of the plurality of standard channels with predetermined logic to determine whether a predetermined threshold variance exists between the first performance aspects of the plurality of standard channels and the expected performance aspects of the plurality of standard channels at the first readable device. The processor 132 may generate an alert indicative of a predetermined threshold variance existing between the first performance aspects and the expected performance aspects for the first readable device.

By capturing, analyzing and storing the spectrum data from each readable device 106, the cable network data analytics system 130 is able to analyze and compare any one modem's attribute data to another. One advantage of this comparison is understanding potential drivers in spectrum variance patterns. For example, when a variance is located at a readable device 106, attributes about the readable device 106 may also be analyzed to determine any applicable patterns, e.g., specific readable device 106 makes or models having recurring issues. Isolating readable devices 106 with ongoing issues allows network operators to remove those readable devices 106 from the customers' premises to prevent future impacts and also provides network operators with operational intelligence in negotiations with readable device 106 manufacturers and/or vendors.

Similarly, all readable devices 106 contain embedded firmware specific to the readable device 106 and chipset manufacturer. As with software upgrades in a home computer, readable device 106 firmware needs to be updated throughout the lifecycle of the readable devices 106. From time to time, firmware versions/releases can impact readable device 106 functionality and recurring analysis by the cable network data analytics system 130 can isolate the readable devices 106 with the embedded firmware. Network operators may coordinate with manufacturers of the readable devices 106 to address firmware issues and ensure geographic locations in which readable devices 106 with impacted or problematic firmware are deployed are protected/cleansed from the firmware impact. Additionally, the cable network data analytics system 130 according to the present disclosure may provide generalized and/or anonymized communiqués or alerts across network operators with information about any known readable device 106 make and model or firmware issues.

Some embodiments of the present disclosure may use spectrum analytics to preemptively address video spectrum issues before they impact customers of the network operator. With the spectrum and cable data that is housed in the data warehouse 142, intraday reports and real time views in the intelligence portal 144 can be generated and pinpointed geographically at the street level that detail video spectrum health for all CEA standard channels and all customer premises with a readable device 106. These video spectrum health reports may be predicated on the union of the intraday polling of the readable devices 106, combined with the network operator's billing and cable network 100 topology data. The analysis can be presented at a variety of aggregation levels including at the individual household passed, or the entire node 104, headend 102, market, region etc.

In one example, an engineer in the headend or network operating center may have the capability to view video spectrum heath for all households passed on any node 104 or distribution leg 107 within the network operator's footprint. The engineer may remotely conduct a variety of troubleshooting protocols in the cable network 100 on any node 104 and/or readable device 106 experiencing video spectrum pattern variances, and if appropriate send a network technician to address the issues at the exact distribution leg 107 or readable device 106 experiencing discrepancies.

In one embodiment, a cable network data analytics system 130 according to the present disclosure may be used to create a device signature profile for each of the plurality of readable devices 106 within the cable network 100. With the creation of a device signature profile for each readable device 106 deployed on customers' premises, power supplies and headends 102, network operators can attain enriched troubleshooting capabilities visible in the intelligence portal 144 through triangulation efforts as will be described below.

The triangulation activity begins when a baseline spectrum data file snapshot is taken of each readable device 106 at the time of its first installation on a distribution leg 107 in the network operators' cable network 100. The baseline spectrum data file snapshot may be tagged with the readable device 106 MAC address, and the date and time of the snapshot, which data may be stored in the data warehouse 142. It is presumed that at the time of the initial installation of the readable device 106, the baseline spectrum data files of the readable device 106 serve as readable device 106 baseline spectrum data and/or as a historical reference of expected performance aspects for at least one of the plurality of standard channels (e.g., expected performance aspects for CEA standard channels including multiple television, or digital video channels within each CEA standard channel) for the readable device 106 to which to compare the behavior of the readable device 106 over time.

The second source of the triangulation activity may be acquired from predetermined reference readable devices 106 installed in a predetermined reference location in the cable network 100 (e.g., at the headend 102) and may be referred to as reference device spectrum data or reference device spectrum data files. Each of the predetermined reference readable devices 106 may be included in the intraday polling schedule performed by the data poller 124. Per best practices, reference device spectrum data files of the reference readable devices 106 may also be tagged with the MAC address of the respective reference readable device 106 and with the date and time of the polling. The reference device spectrum data files may be indicative of reference performance aspects for a plurality of channels (CEA standard channels and/or one or more television channels in a CEA standard channel) at the reference readable device 106.

The third source of triangulation data may be the ongoing intraday polling of readable devices 106 installed in customer premises throughout the cable network 100, which may provide spectrum data files indicative of current performance aspects of the plurality of standard channels at the readable device 106 and may be referred to as current readable device 106 spectrum data or current readable device 106 spectrum data files. Subsequent to being decoded, the current readable device 106 spectrum data files may be compared in the data warehouse 142 with the baseline spectrum data file for that readable device 106 and/or with the reference spectrum data files for the reference readable devices 106 in the headend 102 in which they reside.

For example, predetermined logic including various algorithms for these comparisons may be designed to compare the current spectrum data for the readable device 106 with the baseline spectrum data for the readable device 106, compare the current spectrum data for the readable device 106 with the reference device spectrum data, compare the baseline spectrum data for the readable device 106 with the reference device spectrum data, and combinations thereof, to determine whether predetermined threshold variances exist between the performance aspects and the expected performance aspects, for example by looking for center channel frequency variances across all frequencies within the spectrum data files of the readable device 106. When spectrum variances are found that could potentially drive service disruptions to the network operators' customers, proactive alerts can be provided both on the intelligence portal 144 screen, and to the network operating center and headend engineers via SMS, email or other preferred notification protocols.

For example, identification of variances at the individual readable device 106 level (for which the location, node 104, and distribution leg 107 is known from the billing data in the data warehouse 142) when compared back to the reference baseline device 106, allows for the assessment of the depth and breadth of the variance to ascertain whether the variance is isolated to a single readable device 106, street, distribution leg 107, node 104, etc. The corresponding result of the triangulation efforts afforded by the device signature profile allows the appropriate engineers to preemptively stabilize the cable network 100 while simultaneously warding off potential customer impacts.

In some exemplary embodiments, in addition to the device signature analysis efforts outlined above, a secondary benefit to storing spectrum data for each readable device 106 in the data warehouse 142 may be the ability to determine spectrum anomaly patterns over time. As historical spectrum data file marts grow with the passing of time and the network operators install larger numbers of readable devices 106 on their cable networks, such as the cable network 100, so too grows the ability to examine center channel frequency variances for patterns. Information about patterns may be aggregated, annonymized, and provided across network operators in some embodiments of the present disclosure, to enable network operators to anticipate and proactively identify and address issues.

As any one center channel frequency in a RF-spectrum of a readable device 106 begins to evidence service impacting variances or failure to meet predetermined performance requirements such as frequency suck-outs, standing waves, ingress, SNR etc., the spectrum data for that readable device 106 can be tagged and documented in the data warehouse 142. Over time, a complete library of major spectrum variances can be established and corresponding analysis can transpire to catalog the behavior of a center channel frequency prior to the inception of the variance. These catalogs can then be used to generate predictive models, which will exploit the patterns found in the historical spectrum data to compare to current intraday polling files for each readable device 106. The net result of these efforts will be the ability to generate predictive analytics within the intelligence portal 144 to proactively notify network operators that a spectrum fault may be about to begin at a readable device 106 and/or at a distribution leg 107 in the cable network 100.

A variety of reports, dashboards, and views in the GUI, hereinafter referred to as reports, can be produced within the intelligence portal 144 from the linking or aggregating of the spectrum data and other network operator data. This includes business intelligence reports to understand key performance indicators, historical trends, goal trending etc., along with the operational support reports that provide real time updates to engineers and support personnel. With the network operators' cable network 100 topology, channel lineup, and billing data that is stored in the data warehouse 142, spectrum analysis reports can be aggregated by node 104, headend 102, market, region, division etc.

Figure 11:
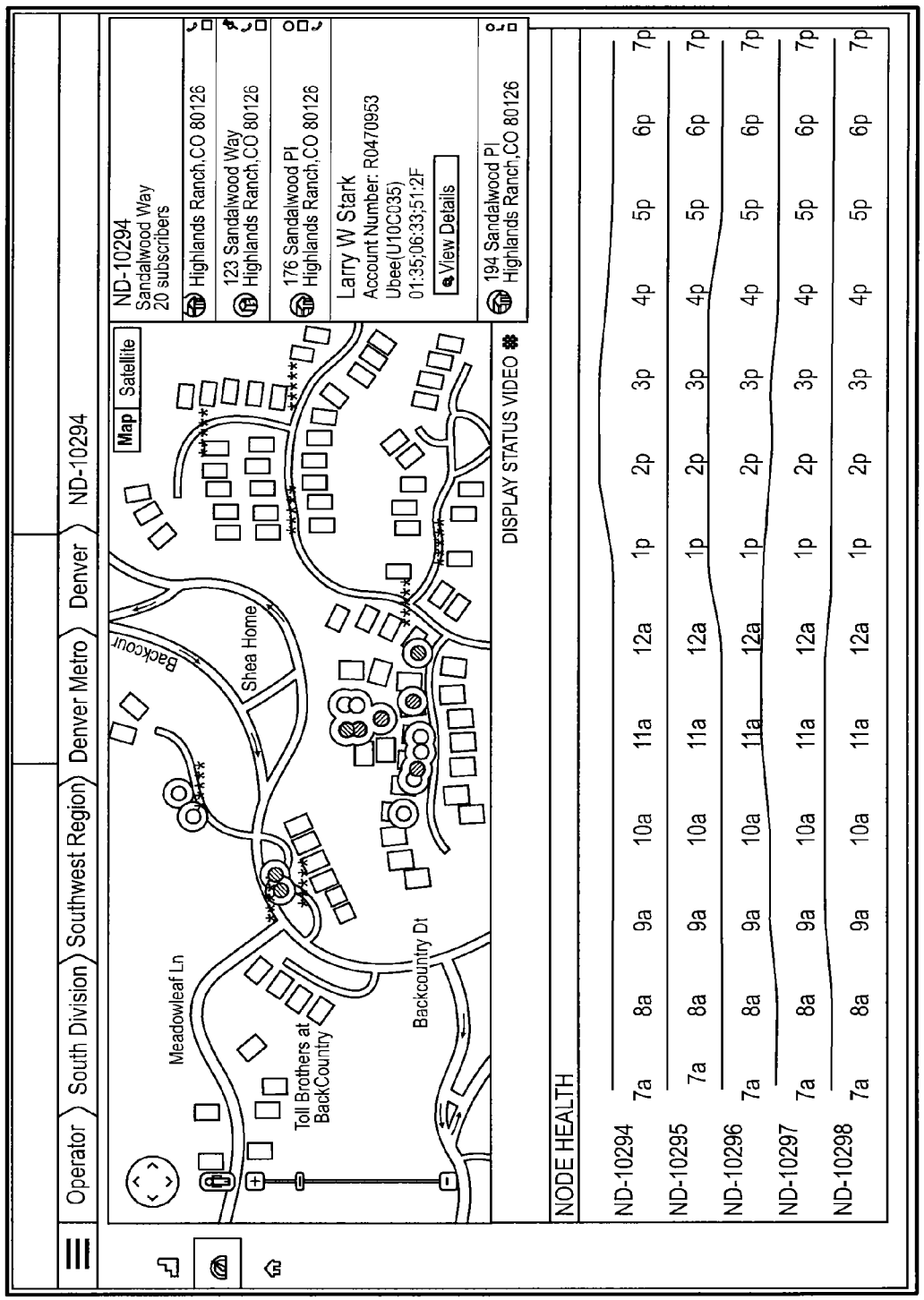
FIG. 11 is an exemplary embodiment of a product status based on spectrum health by customer type report according to exemplary embodiments of the present disclosure.

An example of a product status report (e.g., based on spectrum health or readable device 106 health) by customers type—residential, multiple dwelling unit, or small business-pinpointed geographically at the street level is shown in FIG. 11. Further as shown in FIG. 11, hourly node 104 status based on spectrum health may be included, or a real-time display of node 104 health, distribution leg 107 health and/or readable device 106 health may be displayed by an indicator such as a color, shape, icon, blinking or moving indication, audible alert, haptic alert, or combinations thereof, for example.

Figure 12:
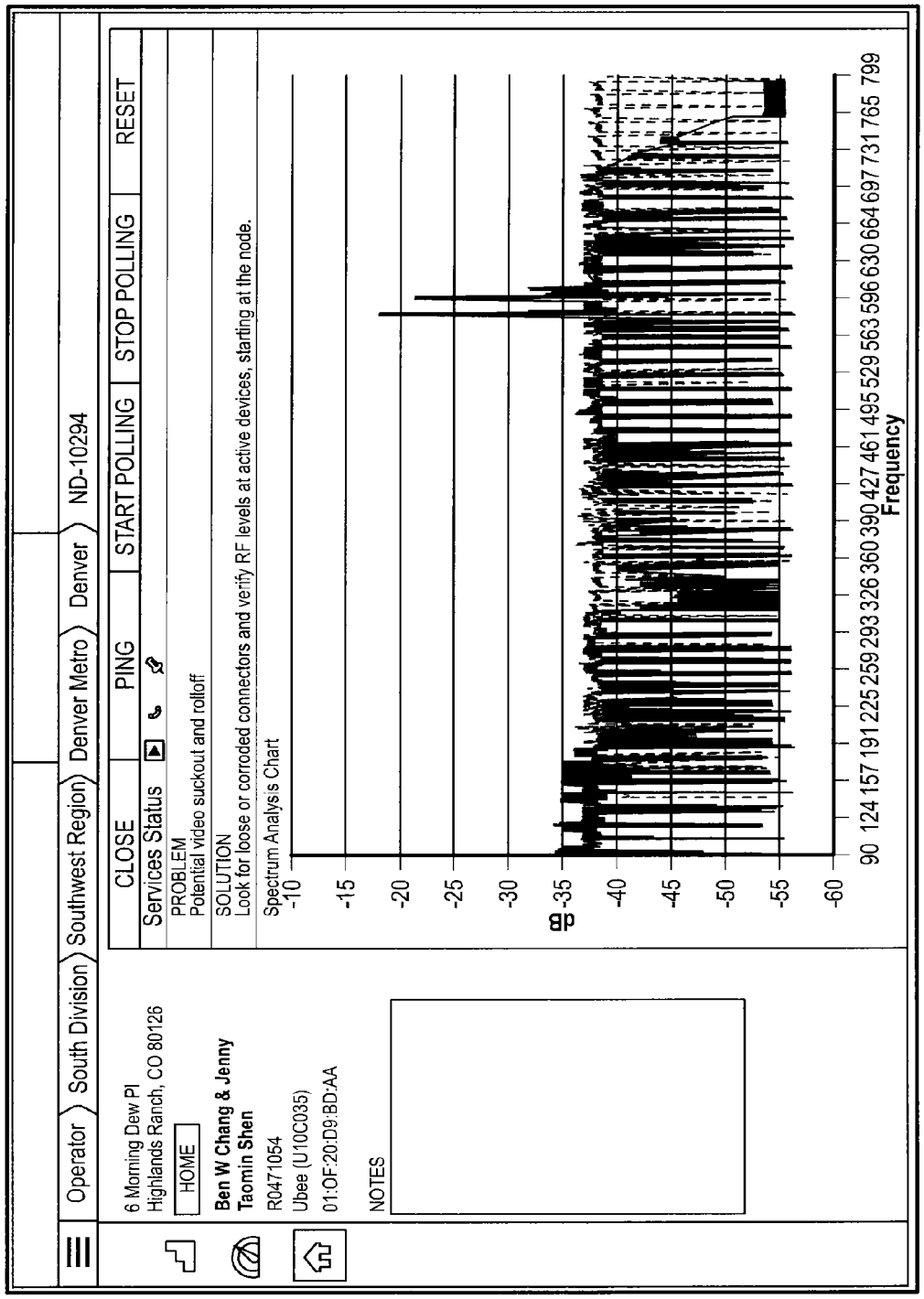
FIG. 12 is an exemplary embodiment of a center channel frequency variance for impacted customers report according to the present disclosure.

Referring now to FIG. 12, shown therein is an embodiment of center channel frequency variances for impacted customers report according to the present disclosure. The report may include graphical readouts of center channel frequency variances at the readable device 106 level with possible errors and solutions.

Other report examples include 24-hour, weekly, and/or monthly cable network 100 availability uptime reports based on empirical knowledge/spectrum variances. In some embodiments, reports may be indicative of corrected and uncorrectable packet errors by node 104 and readable device 106 types.

Further, in some embodiments, reports may include analysis of truck roll percentages/call center activity before and after utilization of spectrum analytics for preemptive troubleshooting; analysis of LTE interference that may drive FCC fines; understanding of recurring problems with certain firmware or modem models, etc. A further example of reports include an overall Bit Error Rate (BER), Modulation Error Ratio (MER), Signal Level/Strength, Signal to Noise Ratio (SNR), Channel Equalization Monitoring, Frame Lock per node and percent of impacted nodes.

Further, the intelligence portal 144 may provide reports indicative of 24 hour, weekly, and monthly snapshots of node 104 and CEA standard channel performance compared to a predetermined performance criteria or goal.

In some embodiments, business intelligence may provide 13-month rolling reports for forecast and budgeting on all significant metrics for the cable network 100.

As will be appreciated by persons of ordinary skill in the art, the above reports represent a portion of the potential analytics and/or reports that may be made available to network operators by the intelligence portal 144 and/or by the cable network data analytics system 130 according to the present disclosure by leveraging RF-technology, integration and centralization of data. Reports and analytics according to embodiments of the present disclosure provide network operators with enhanced spectrum visibility and operational capabilities.

For example, meaningful customer data correlation and competitive differentiation may be delivered to network operators according to embodiments of the present disclosure to aid network operators in their ongoing quest to provide quality of service and quality of experience to their customers. The ability to attain real-time, remote spectrum visibility for all products, including video, via the enhanced technology of the readable devices 106 may enable network operators to identify and mitigate spectrum issues before they drive customer impacts.

When calls do come into the call center and trucks do need to roll to customer premises, application based toolsets like the intelligence portal 144 may provide call center agents with the ability to validate customer claims of channel impairment. Additionally, technicians' troubleshooting capabilities can be enriched through the intelligence portal 144 by helping technicians determine to a much greater degree than just using a handheld spectrum analyzer, the extent within the node 104 and corresponding distribution leg 107 of the signal degradation(s). The operational support system functions within the intelligence portal 144 can also provide the technician with visibility into all CAE channels on the node 104 to determine the range of the impact.

Further, as network operators strive to stabilize their cable networks 100 through these technological capabilities and other methodologies, it is important to be able to baseline initial readable device 106 performance and then monitor trends and improvement percentages. Application-based analysis supported in the intelligence portal 144 through enhanced spectrum analytics can provide cable executives with the needed visibility into their cable network 100 Key Performance Indicators (KPIs) along with the corresponding reports required to manage their annual network budgets, forecasts and goal trending.

Figure 13:
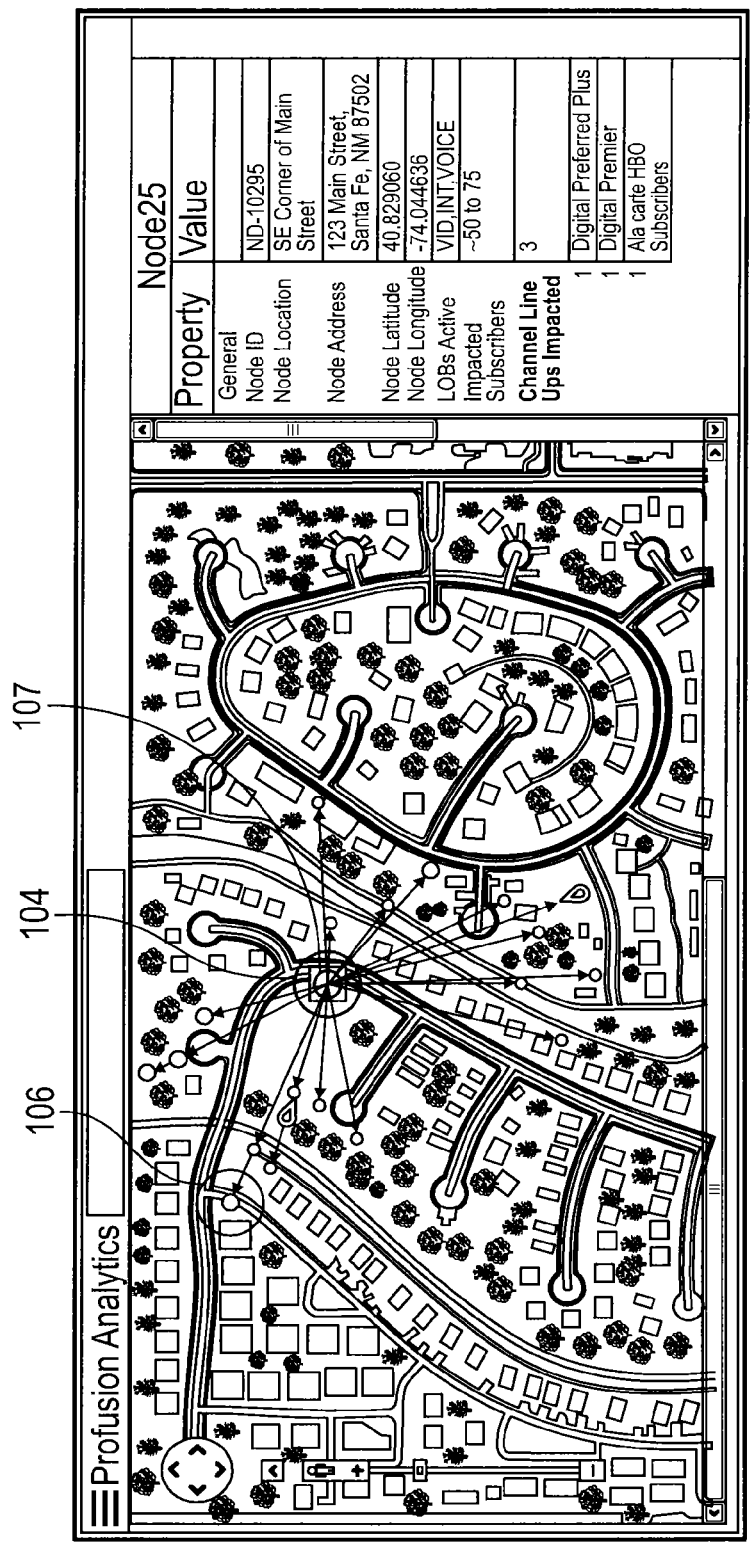
FIG. 13 is an exemplary embodiment of a report showing an estimate of impacted subscribers and channel lineup according to the present disclosure.

For example, as shown in FIG. 13 embodiments of the present disclosure enable technicians to have visibility into the real-time health of each CEA standard channels' spectrum at the customer's premises, along with an understanding of the spectrum health of all other customer premises passed within the node 104. As shown in FIG. 13, embodiments of the cable network data analytics system 130 according to the present disclosure provide a graphical user interface or a report indicative of an estimate of the number of impacted subscribers or customers (as shown in the second to last line in the text box on the right), along with an estimate of the impacted CEA standard channel lineup (as shown in the last line in the text box on the right), by marrying spectrum data with other applicable operator data to provide network operators with timely or immediate (e.g., substantially real-time) actionable intelligence and/or reports regarding how widespread an issue may be and at what level the customers' nodes 104, distribution legs 107, and/or readable devices 106 are impacted by the issue.

Further, deploying a web-based spectrum analytics tool via the intelligence portal 144 according to some embodiments of the present disclosure may support granular assessment of signal strength at a headend 102, node 104, and CEA standard channel level. Visibility into the data at the cable network 100 and individual readable device 106 level may promote preemptive examination of weak signals, interference, tilt, and other sub-optimal performance, while also supporting the proactive routing of network technicians to the exact node 104 and distribution leg 107 impacted. Historical spectrum data in some embodiments of the intelligence portal 144 may promote preemptive assessment of current issues in the cable network 100.

In some embodiments, customer account executives (CAEs) may be provided with a spectrum health view within existing troubleshooting toolsets provided to the CAE's and may receive training to use the information in addressing customer issues. In addition to attaining visibility into the spectrum health of the specific customer's readable device 106 the CAEs are troubleshooting, CAEs may also receive visibility into spectrum health for the entire node 104 along with the capability to do a live ping of the readable device 106 to attain real time graphical readouts of the spectrum.

Figure 14:
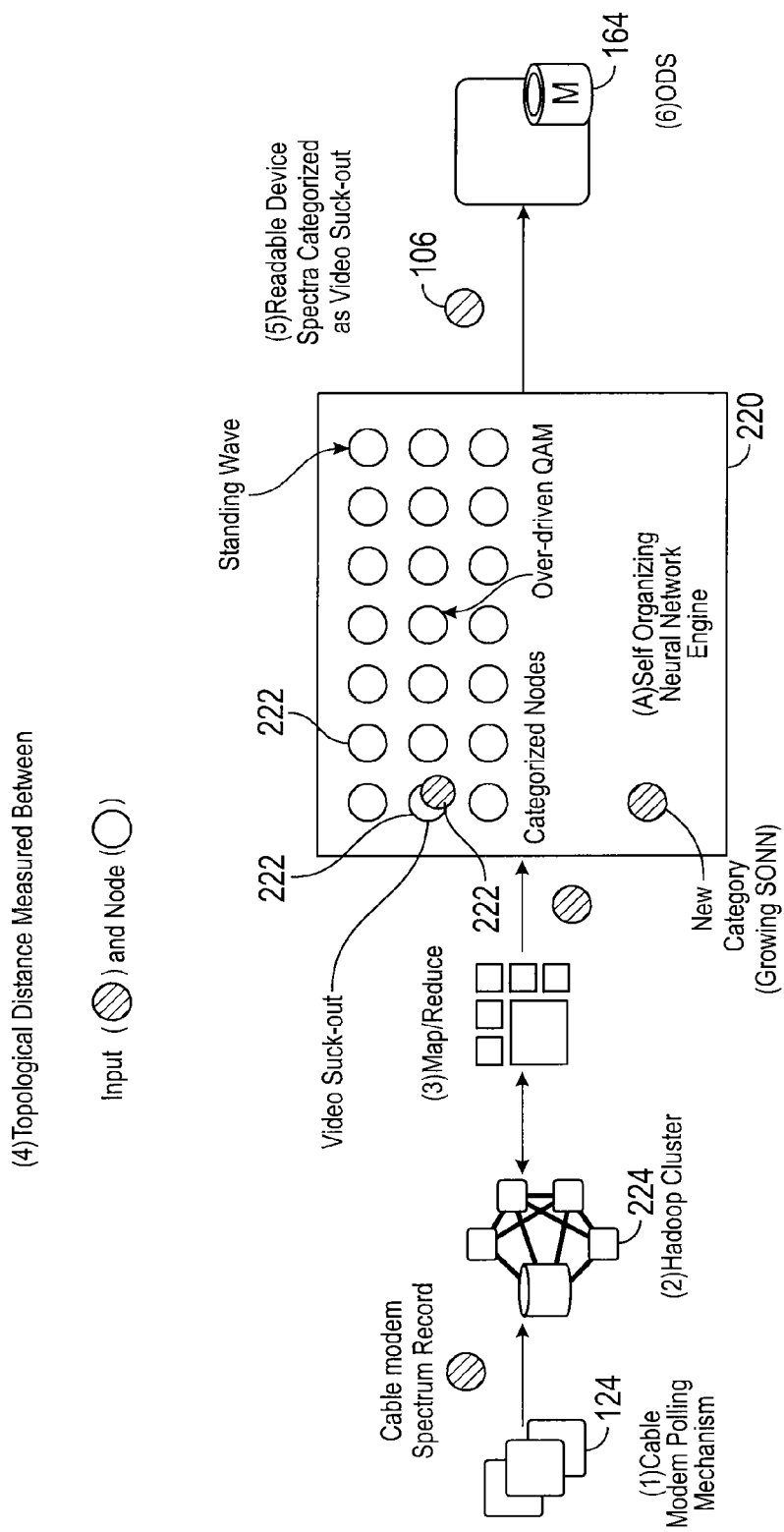
FIG. 14 is an exemplary embodiment of a cable network data analysis system implemented with a distributed processing system according to an exemplary embodiment of the present disclosure.

Referring now to FIG. 14, shown therein is a diagram of a self-organizing neural network (SONN or SONNs) that may be implemented by the cable network data analytics system 130 and/or by the intelligence portal 144 in some embodiments of the present disclosure. When interpreting the spectrum data files collected from one or more readable devices 106, the intelligence portal 144 may identify the classification of any unknown events, also referred to as variances. For example, variances may include partial or full standing wave interferences, video suck-outs, or broadcast outages.

The intelligence portal 144 may utilize a variety of methodologies to analyze the spectrum data, one of which may involve using a Kohonen self-organizing neural network (SONNs) 220 to classify these unknown events or variances. In addition, because of the large amount of spectrum data collected by the data poller 124 and/or analyzed by the intelligence portal 144, a scalable application may be carried out by utilizing distributed processing techniques (e.g., by using multiple processors 132). Examples of distributed processing methods and/or algorithms that may be implemented with embodiments of the present disclosure include: Hadoop which uses one or more Map/Reduce algorithms; a combination of Hadoop and MongoDB with Map/Reduce algorithms; a shared Mongo DB instance with Map/Reduce algorithms; and a generic multi-stream pipeline system utilizing commodity servers to distribute the work without using Map/Reduce paradigms. Because of the flexibility provided by the combined embodiments of Hadoop and MongoDB, the intelligence portal 144 may utilize this distributed processing to carry out spectrum analysis processes according to exemplary embodiments of the present disclosure.

In some embodiments of the present disclosure, the SONN 220 may take as input, spectral data from a large number of readable devices 106. The data may be clustered into one or more readable device 106 groups or clusters and a topological ordering of the readable device 106 clusters may be created. The readable device 106 clusters may be represented by a set of input weights. Typically, the weights may be initialized as small random numbers at the start of the learning process, and may evolve over time to minimize the sum of the distances of the input patterns from their corresponding cluster nodes 222 as represented by the weight of each node 222. In some embodiments of the present disclosure, node 222 weights may be initialized by spectra representing known categories, as defined by the intelligence portal 144 and/or by a network operator.

For example, assuming the neural network 220 is represented by a 4×4 grid, where each node 222 in the grid represents up to sixteen different categories of readable device 106 spectra (e.g. normal spectrum, or spectrum experiencing variances such as full or partial standing waves, video suck-out etc.). The parameters of the neural network 220, including neighborhood and learning restraints may be optimized by trial and error and may be dependent on the QAM size of the frequencies and other parameters. There may be two embodiments of the SONN 220, one using a Growing Self-organizing maps (GSOM) and another using Adaptive Resonance Theory (ART).

GSOM is well known for being able to develop a highly resolved set of clusters and ART has the advantage of being able to classify events that SOM is not able to classify. In some embodiments of the present disclosure, the intelligence portal 144 may employ a combination of both GSOM and ART to provide the richest visual representation of the spectra behavior.

The data collector 138 of the cable network data analytics system 130 obtains data from the readable devices 106 representing spectra from customer readable devices 106. In one embodiment the data are collected via the data poller 124 and are then stored on a distributed file system 224. A Map/Reduce algorithm may be implemented to process the data through the SONN 220. An incarnation of the Map/Reduce algorithm in some embodiments of the present disclosure may be produced in the following manner:

Map algorithm—a key for the algorithm may be a MAC address or other unique identifier of a readable device 106, and a value may be the full forward spectrum of the readable device 106, the time of the collection of the data, and other identifying records. The produced value may be an input to the Reduce function.

The Reduce function may include inputting each spectral record into the SONN 220, and calculating the nearest node 222 based on the node 222 weights and the topological distance of the input spectra from the node 222. Weights may be adjusted as appropriate based on learning parameters and readable device 106 metadata may be enriched by the category of spectrum variance as determined by the closest calculated node 222.

A second embodiment of the Map/Reduce algorithm according to some embodiments of the present disclosure may be implemented in the following manner:

Map algorithm—the key for the algorithm may be the MAC address or other unique identifier of the readable device 106 and the value is the Probability Distribution Function (PDF) distribution of Fast Fourier Transform (FFT) spectrum of the readable device 106, the time of the collection of the data, and other identifying records. The full FFT can also be included. The produced value may be an input to the Reduce function.

Reduce function—for each spectral record, the data is input into the SONN 220 and are calculated to the nearest node 222 based on the node 222 weights and the topological distance of the input spectra from the node 222. The weights are adjusted as appropriate based on learning parameters and emit the modem metadata enriched by the category of spectrum variance as determined by the closest calculated node 222.

After a sufficient learning period over a large random set of data, the spectrum variance categories may become sufficiently refined so that input spectra are easily catalogued in the ODS 164 of the cable network data analytics system 130.

This cataloguing of spectra enables predictive capabilities of the cable network data analytics system 130 according to embodiments of the present disclosure, such as providing characterizations of readable device 106 anomalies across a broad range of geographical locations which would normally go undetected unless a spectrum analyzer were deployed to the field (e.g., via a node sweep). New anomalies may be recorded as part of the GSOM and therefore allow network operators to train the GSOM and/or the neural network 220 to know before, during, and after an event the characteristics of the equipment and provide the proactive capabilities needed to take action ahead of customer impacts. The use of SONNs 220 with embodiments of a cable network data analytics system 130 according to the present disclosure provides a robust approach to proactively and preemptively identify variances prior to customer impact while simultaneously increasing service reliability.

Figure 15:
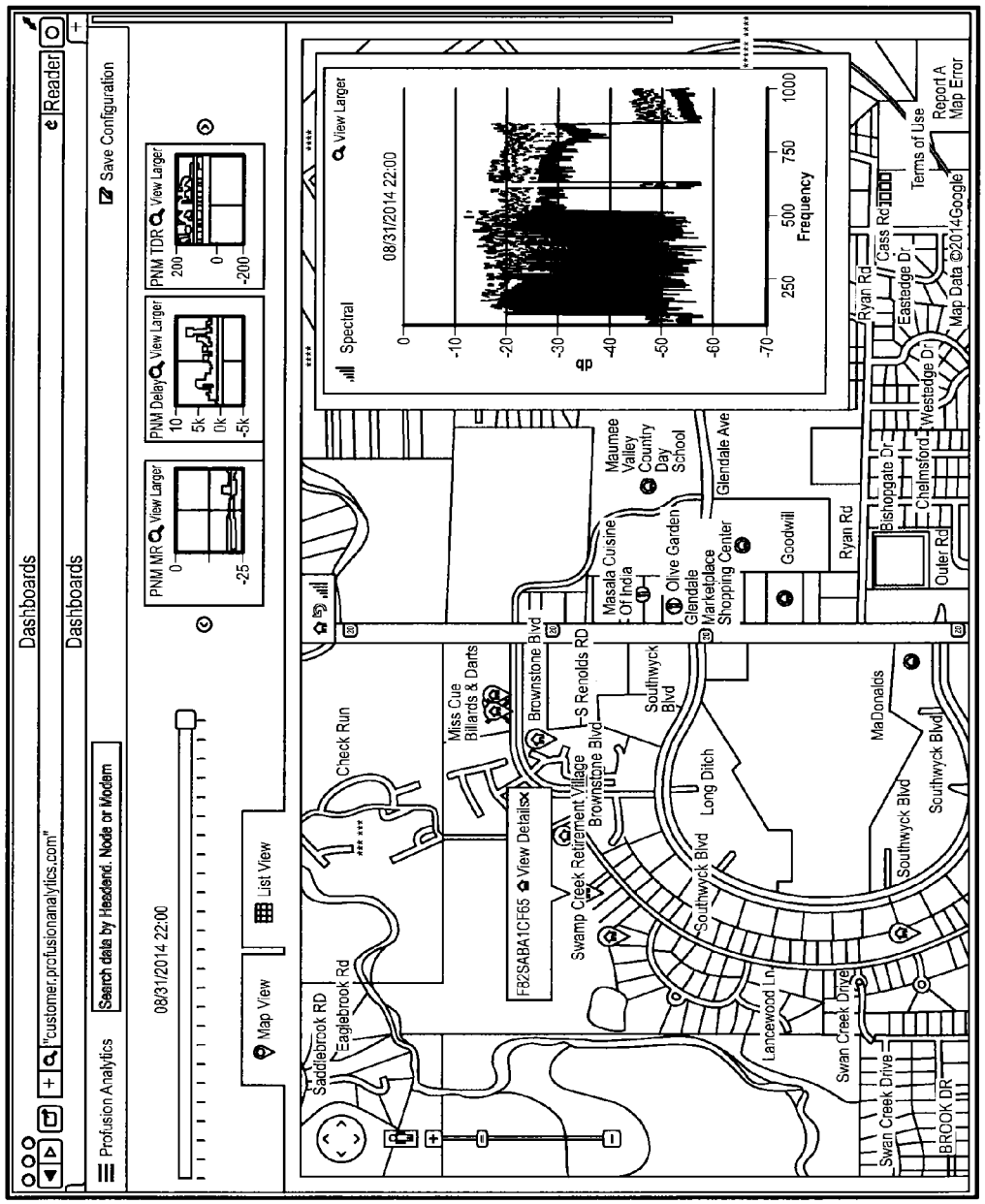
FIG. 15 is an exemplary embodiment of a geo-located rendering providing a product status report by location of readable devices at a street level. The product status report includes graphical representations of spectral health and a plurality of Proactive Network Maintenance measures.

FIG. 15 illustrates an exemplary embodiment of a geo-located rendering providing a product status report of one or more readable devices 106 by location on a map, e.g., at a street or neighborhood level. The product status report provides a rendering of the readable device(s) 106 on the map, and graphical representations of corresponding spectral health 300 of the readable device(s) 106 and one or more Proactive Network Maintenance measures 302. For example, in FIG. 15, the spectral health 300 is visually depicted in a graphical readout of center channel frequency variances at the readable device 106 level. Further shown in FIG. 15, the product status report may include a search feature 304 configured for searching of data within the product status report by headend, node, modem, street address, and/or the like.

In some embodiments, a time slider may be included for displaying spectral health and/or Proactive Network Maintenance views. Using the time slider, such information may be provided real-time and/or re-rendered at a set interval (e.g., up to twenty-four hours prior). For example, the product status report may display 24-hour, weekly, and/or monthly representations of the spectral health 300 and/or the Proactive Network Maintenance measures 302 based on the configuration of the time slider selected by the user.

Figure 16:
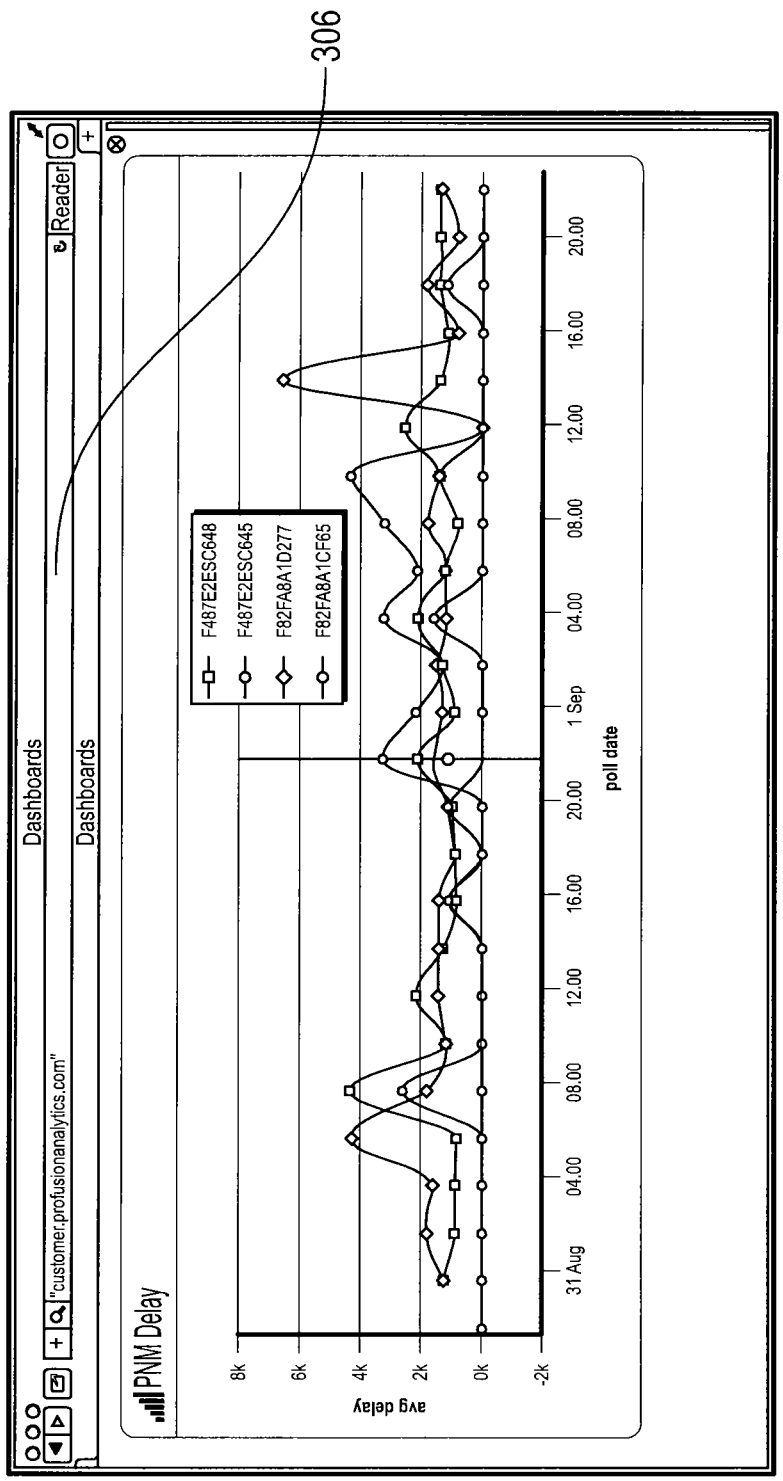
FIG. 16 is an exemplary embodiment of a Proactive Network Maintenance measure, a group delay report, illustrated in FIG. 15.

FIG. 16 illustrates an enlarged view of a group delay report 306. The group delay report is a graphical representation of one of the Proactive Network Maintenance measures 302 illustrated in FIG. 15. The group delay report may include one or more graphical readouts of the group delay measurement for one or more of the readable device(s) 106.

Figure 17:
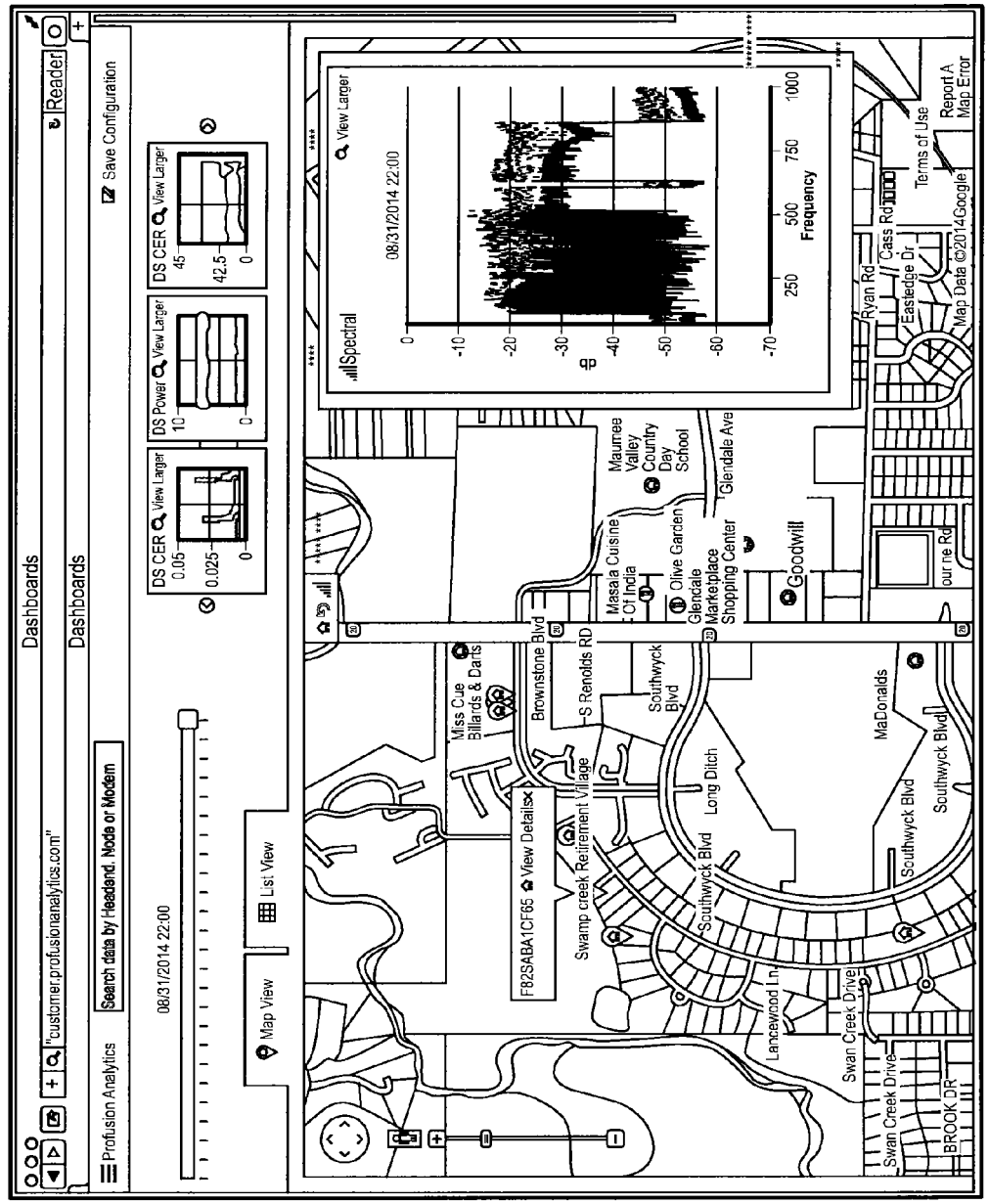
FIG. 17 is another exemplary embodiment of a geo-located rendering providing a product status report by location of readable devices at a street level. The product status report includes graphical representations of spectral health and a plurality of downstream metrics.

FIG. 17 illustrates another exemplary embodiment of a geo-located rendering providing a product status report by location on a map of one or more readable devices 106 at the street level. The product status report provides a rendering of the readable device(s) 106, and graphical representations of corresponding spectral health 300 of the readable device(s) 106 and one or more downstream metrics 308.

Similar to FIG. 15, the search feature 304 may be configured for searching of data using headend, node, modem, street address, and/or the like in the product status report illustrated in FIG. 17. Additionally, the time slider may be included for displaying spectral health and/or downstream metric views and provided in real-time and/or re-rendered at a set interval (e.g. up to twenty-four hours prior).

Figure 18:
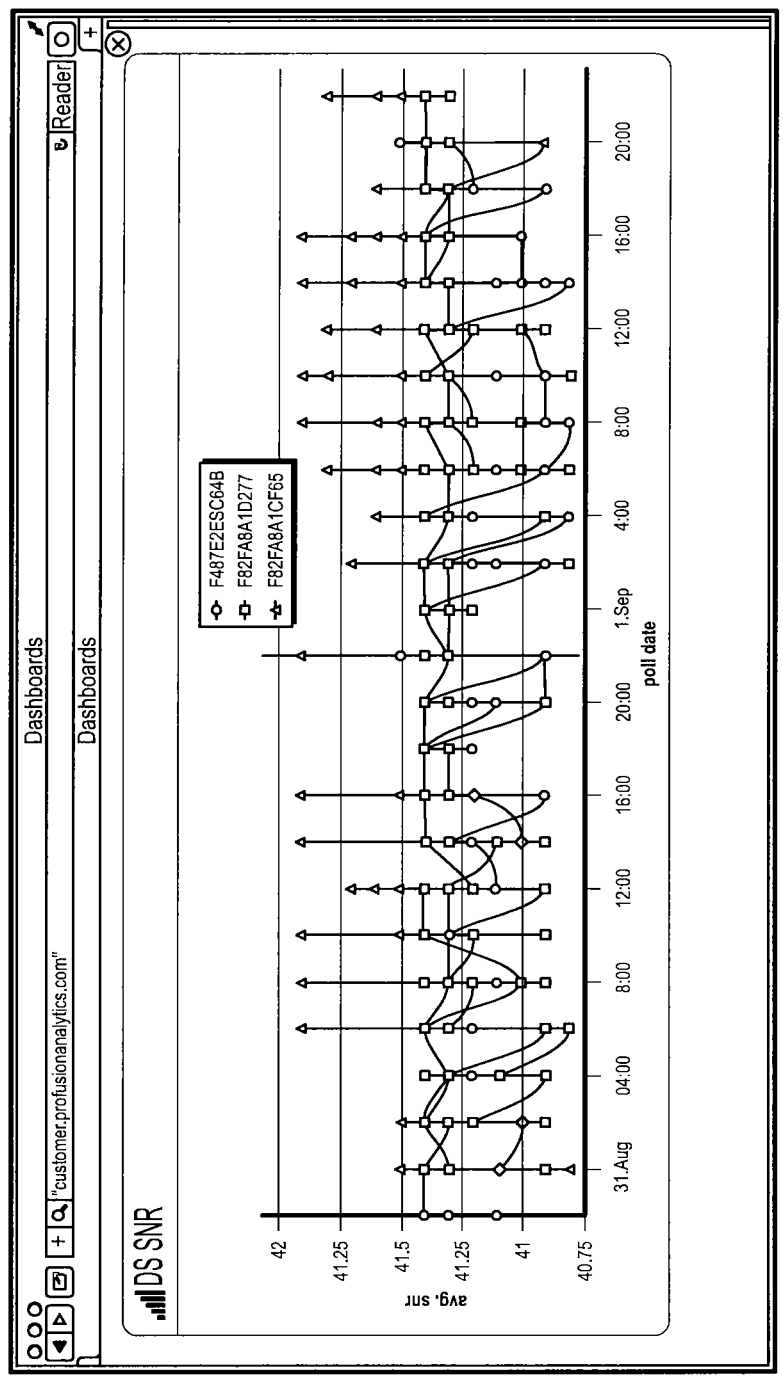
FIG. 18 is an exemplary embodiment of a downstream metric, signal to noise report, illustrated in FIG. 17.

FIG. 18 illustrates an enlarged view of a signal to noise ratio report 310. The signal to noise report is a graphical representation of one of the downstream metrics 308 illustrated in FIG. 17. The signal to noise report may include graphical readouts of the signal to noise ratio measurements for one or more readable devices 106.

Figure 19:
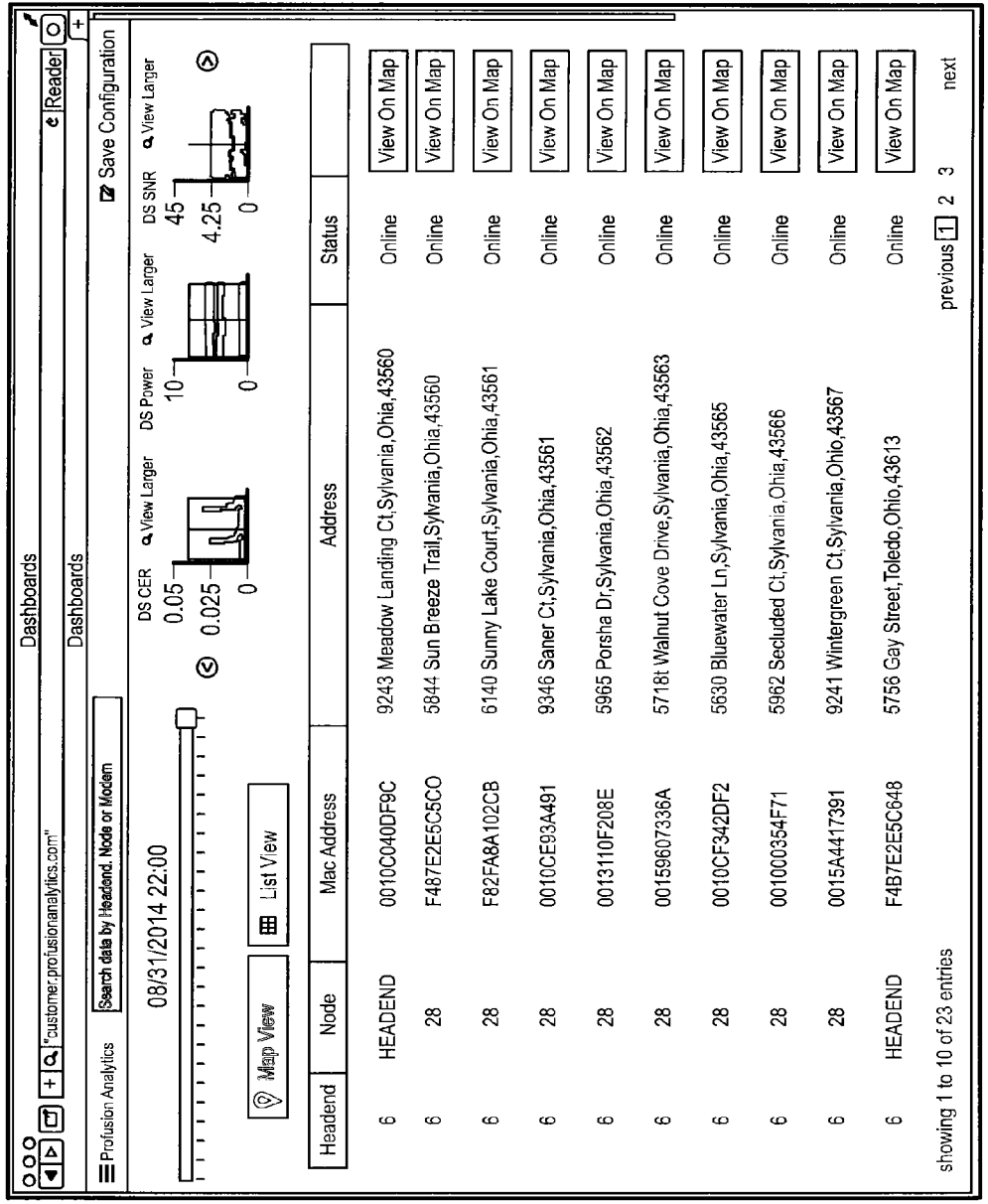
FIG. 19 is an exemplary embodiment of a list view of the product status report illustrated in FIG. 17.

FIG. 19 illustrates an exemplary list view of the product status report illustrated in FIG. 17. The list view may be for one or more readable devices 106. Details within the list view may include, but are not limited to, mac address, corresponding street address, network location, status, as well as one or more areas on the product status report that upon selection causes a processor to execute a particular function, such as the ability to view the readable device 106 on a map, and/or the like.

It is to be understood that the process steps disclosed herein may be performed simultaneously or in any desired order, and may be carried out by a human, or by a machine, and combinations thereof, for example. For example, one or more of the steps disclosed herein may be omitted, one or more steps may be further divided in one or more sub-steps, and two or more steps or sub-steps may be combined in a single step, for example. Further, in some embodiments of the present disclosure, one or more steps may be repeated one or more times, whether such repetition is carried out sequentially or interspersed by other steps or sub-steps. Additionally, one or more other steps or sub-steps may be carried out before, after, or between the steps disclosed herein, for example.

As will be appreciated by persons of ordinary skill in the art, embodiments of the present disclosure described herein represent a portion of the analytics that may be available to network operators by leveraging spectrum RF-technology, integration with network operator data, centralization, and big data. The reports and processes provided by the intelligence portal 144 according to embodiments of the present disclosure may provide other spectrum visibility and operational capabilities.

From the above description, it is clear that the embodiments of the present disclosure are well adapted to carry out the objects and to attain the advantages mentioned herein as well as those inherent in the embodiments of the present disclosure. While exemplary embodiments of the present disclosure have been described, it will be understood that numerous changes may be made which will readily suggest themselves to those skilled in the art and which are accomplished within the scope of the present disclosure and as defined in the appended claims.

The invention claimed is:

1. A cable network data analytics system, comprising at least one processor coupled with non-transitory processor-readable medium storing processor executable instructions for causing the at least one processor to:
aggregate a first spectrum data set and a second spectrum data set into an aggregated spectrum data file stored in a non-transitory processor-readable medium, the first spectrum data set indicative of spectrum data from a first readable device configured to receive, measure, process, and transmit spectrum data, the first readable device connected to a cable network and including video spectrum data indicative of first performance aspects of a plurality of standard channels received by the first readable device from the cable network, the second spectrum data set indicative of spectrum data from a second readable device configured to receive, measure, process, and transmit spectrum data, the second readable device connected the cable network and including video spectrum data indicative of second performance aspects of the plurality of standard channels received by the second readable device from the cable network;
analyze the aggregated spectrum data file with predetermined logic to determine whether the at least one of the first and second performance aspects meet predetermined performance requirements; and
generate an alert indicative of at least one of the first and second performance aspects not meeting the predetermined performance requirements.

2. The cable network data analytics system of claim 1, wherein the aggregated spectrum data file is indicative of the first and second performance aspects at a first set of instances in time, and wherein the predetermined performance requirements are based at least in part on a spectrum data set including video spectrum data indicative of at least one of: one or more first service-impairment aspects of the plurality of standard channels at a second set of instances in time and one or more second service-impairment aspects of the plurality of standard channels at the second set of instances in time, the second set of instances in time being earlier than the first set of instances in time.

3. The cable network data analytics system of claim 2, wherein the alert is further indicative of at least one of the plurality of standard channels not meeting the predetermined performance requirements.

4. The cable network data analytics system of claim 1, wherein the non-transitory processor-readable medium storing processor executable instructions for causing the at least one processor to transmit the alert to a remotely-located user via an output port.

5. The cable network data analytics system of claim 1, wherein the non-transitory processor-readable medium stores processor executable instructions for further causing the at least one processor to:
access baseline data for the first readable device indicative of baseline performance aspects of the plurality of standard channels at the first readable device;
analyze the first spectrum data from the first readable device and the baseline data for the first readable device with predetermined logic to determine whether a predetermined threshold variance exists between the first performance aspects of the plurality of standard channels and the baseline performance aspects of the plurality of standard channels; and
generate an alert indicative of a predetermined threshold variance existing between the first performance aspects and the baseline performance aspects for the plurality of standard channels and transmit the alert to a user via an output port.

6. The cable network data analytics system of claim 5, wherein the non-transitory processor-readable medium stores processor executable instructions for further causing the at least one processor to:
access baseline data for a plurality of readable devices coupled with the cable network indicative of baseline performance aspects of the plurality of standard channels at the plurality of readable devices;
analyze the baseline data for the first readable device and the baseline data for the plurality of readable devices with a predetermined logic to determine whether a predetermined threshold difference exists between the baseline performance aspects of the plurality of standard channels at the plurality of readable device and the baseline performance aspects of the plurality of standard channels at the first readable device; and generate an alert indicative of the existence of a predetermined threshold difference and transmit the alert to a user via the output port.

7. The cable network data analytics system of claim 1, wherein the non-transitory processor-readable medium stores processor executable instructions for further causing the at least one processor to:

access reference data indicative of reference performance aspects of the plurality of standard channels at a reference device coupled with the cable network at a reference location;

analyze the first spectrum data from the first readable device and the reference data with predetermined logic to determine whether a predetermined threshold variance exists between the first performance aspects of the plurality of standard channels at the first readable device and the reference performance aspects of the plurality of standard channels at the reference device; and generate an alert indicative of a predetermined threshold variance existing between the first performance aspects and the reference performance aspects of the plurality of standard channels and transmit the alert to a user via an output port.

8. The cable network data analytics system of claim 1, wherein the non-transitory processor-readable medium stores processor executable instructions for further causing the at least one processor to provide a readable device health report indicative of at least one of: the first performance aspects of the plurality of standard channels at the first readable device and the second performance aspects of the plurality of standard channels at the second readable device to a user via an output port.

9. A cable network data analytics system, comprising at least one processor coupled with non-transitory processor-readable medium storing processor executable instructions for causing the at least one processor to:

access a spectrum data file indicative of spectrum data of a readable device configured to receive, measure, process, and transmit spectrum data, the readable device connected to a cable network and including video spectrum data indicative of at least one performance aspect of a plurality of standard channels received by the readable device from the cable network;

analyze the spectrum data file with predetermined logic to determine whether the at least one performance aspect of at least one of the plurality of standard channel meets predetermined performance requirements; and in response to the at least one performance aspect of the at least one of the plurality of standard channels not meeting the predetermined performance requirements, generate and alert indicative of the at least one of the plurality of standard channels having at least one performance aspect not meeting the predetermined performance requirements and provide the alert to a user via an output port.

10. The cable network data analytics system of claim 9, wherein the spectrum data file indicative of spectrum data is accessed in real-time, and wherein the non-transitory processor-readable medium stores processor executable instructions for further causing the at least one processor to provide the alert to the user in real-time.

11. The cable network data analytics system of claim 10, wherein the alert is indicative of a geographical location of the readable device.

12. A cable network data analytics system, comprising at least one processor coupled with at least one non-transitory processor-readable medium storing processor executable instructions for causing the at least one processor to:

access a first set of data indicative of a current video spectrum of a plurality of standard channels received by a plurality of readable devices configured to receive, measure, process, and transmit spectrum data and coupled with a cable network;

access at least one second set of data indicative of a plurality of digital video channels bundled in each of the plurality of standard channels; and aggregate the first and second sets of data into a relational database stored in the at least one non-transitory processor-readable medium and searchable by at least one search term.

13. The cable network data analytics system of claim 12, wherein the at least one non-transitory processor-readable medium further stores processor executable instructions for causing the at least one processor to:

access a third data set indicative of billing data for at least one customer having at least one of the plurality of readable devices coupled with the cable network; and aggregate the third data set in the relational database stored in the at least one non-transitory processor-readable medium.

14. The cable network data analytics system of claim 12, wherein the plurality of readable devices are coupled with the cable network via at least one distribution leg, and wherein the at least one search term is the at least one distribution leg.

15. The cable network data analytics system of claim 12, wherein the plurality of readable devices are coupled with the cable network via at least one node, and wherein the at least one search term is the at least one node.

16. The cable network data analytics system of claim 12, wherein the plurality of readable devices are coupled with the cable network via at least one node, and wherein the at least one search term is at least one of the plurality of standard channels.

17. The cable network data analytics system of claim 12, wherein each of the plurality of readable devices have a unique identifier, and wherein the at least one search term is the unique identifier for at least one of the plurality of readable devices.

18. A cable network data analytics system, comprising at least one processor coupled with non-transitory processor-readable medium storing processor executable instructions for causing the at least one processor to:

access a first set of data indicative of a current video spectrum of a plurality of standard channels received by a plurality of readable devices configured to receive, measure, process and transmit spectrum data, the plurality of readable devices coupled to a cable network;

access a second data set indicative of a historical video spectrum of at least one of the plurality of standard channels received by at least one of the plurality of readable devices coupled to the cable network, the historical video spectrum captured at a first set of instants in time preceding a second set of instants in time when the at least one of the plurality of standard channels did not meet at least one predetermined performance requirement;

analyze the current video spectrum and the historical video spectrum with a predetermined logic to determine whether the current video spectrum for at least one of the plurality of standard channel received by at least one of the plurality of readable devices and the historic video spectrum for the at least one of the plurality of standard channels are similar to one another;

in response to the historic video spectrum and the current video spectrum being similar to one another, generate an alert indicative of at least one of the plurality of standard channels received by the at least one of the plurality of readable devices expected to not meet the at least one predetermined performance requirement at a third instant in time; and provide the alert to a user via an output port at a fourth instant in time preceding the third instant in time.

19. The cable network data analytics system of claim 18, wherein the alert is further indicative of a geographical location of at least one of the plurality of readable devices receiving the at least one of the plurality of standard channels expected to not meet the at least one predetermined performance requirement at the third instant in time.

20. The cable network data analytics of claim 19, wherein the alert is further indicative of at least one distribution leg to which the at least one of the plurality of readable devices receiving the at least one of the plurality of standard channels expected to not meet the at least one predetermined performance requirement at the third instant in time is coupled.

21. The cable network data analytics of claim 19, wherein the alert is further indicative of at least one node to which the at least one of the plurality of readable devices receiving the at least one of the plurality of standard channels is not expected to meet the at least one predetermined performance requirement at the third instant in time is coupled.

22. The cable network data analytics of claim 18, wherein the predetermined logic includes a neural network having an adaptive algorithm.

23. The cable network data analytics of claim 18, wherein the second data set at the first set of instants in time is indicative of a spectrum variance in the video spectrum.

* * * * *